United States Patent
Uehara et al.

(10) Patent No.: US 11,796,987 B2
(45) Date of Patent: Oct. 24, 2023

(54) SYSTEM AND METHOD FOR SUPPORTING PRODUCTION MANAGEMENT

(71) Applicant: HITACHI, LTD., Tokyo (JP)

(72) Inventors: Hisashi Uehara, Tokyo (JP); Kenichirou Kawakami, Tokyo (JP); Yusuke Yajima, Tokyo (JP); Hiroyuki Maeda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 421 days.

(21) Appl. No.: 17/023,804

(22) Filed: Sep. 17, 2020

(65) Prior Publication Data

US 2021/0294308 A1 Sep. 23, 2021

(30) Foreign Application Priority Data

Mar. 19, 2020 (JP) ................................ 2020-048918

(51) Int. Cl.
*G05B 19/418* (2006.01)
*G06Q 50/04* (2012.01)
(Continued)

(52) U.S. Cl.
CPC ... *G05B 19/41865* (2013.01); *G05B 19/4183* (2013.01); *G05B 19/41885* (2013.01);
(Continued)

(58) Field of Classification Search
CPC .................... G05B 19/41865; G06Q 10/06316
See application file for complete search history.

(56) References Cited

U.S. PATENT DOCUMENTS

| 7,373,211 B1 * | 5/2008 | Logsdon .......... G05B 19/41865 700/121 |
| 2002/0138358 A1 * | 9/2002 | Scheer .................. G06Q 30/06 705/29 |

(Continued)

FOREIGN PATENT DOCUMENTS

| JP | 6287018 B2 | 3/2018 |
| JP | 2019-101598 A | 6/2019 |

(Continued)

OTHER PUBLICATIONS

Lluis Cuatrecasas-Arbos et al, The Operations-Time Chart: A graphical tool to evaluate the performance of production systems—From batch-and-queue to lean manufacturing, Computers & Industrial Engineering vol. 61, Issue 3, Oct. 2011, pp. 663-675 (Year: 2011).*

(Continued)

*Primary Examiner* — Andre D Boyce
(74) *Attorney, Agent, or Firm* — Volpe Koenig

(57) ABSTRACT

Production past record information showing the execution time point of each step is accumulated for each product loaded in a production system. A supporting system calculates, for each step, a retention increase rate at each time point on the basis of the production past record information. The "retention increase rate" is an amount of increase in retention number per unit time. The supporting system displays a holistic chart for a production situation, which has a time axis and a step axis (axis perpendicular to the time axis and corresponding to steps). A display mode of each position in the holistic chart depends on whether a retention increase rate for the time point and step corresponding to the position is a negative value, zero, or a positive value, and a difference between the retention increase rate and a rate reference value (a reference value for the retention increase rate).

13 Claims, 15 Drawing Sheets

(51) Int. Cl.
  *G06Q 10/08* (2023.01)
  *G06Q 20/20* (2012.01)
  *G06Q 10/06* (2023.01)
  *G06Q 10/0633* (2023.01)

(52) U.S. Cl.
  CPC ......... *G06Q 10/06* (2013.01); *G06Q 10/0633* (2013.01); *G06Q 10/08* (2013.01); *G06Q 20/203* (2013.01); *G06Q 50/04* (2013.01)

(56) References Cited

U.S. PATENT DOCUMENTS

| | | | | |
|---|---|---|---|---|
| 2002/0143598 A1* | 10/2002 | Scheer | ............... | G06Q 10/06 705/7.26 |
| 2002/0143669 A1* | 10/2002 | Scheer | ............... | G06Q 20/203 705/28 |
| 2002/0161674 A1* | 10/2002 | Scheer | ............... | G06Q 10/0631 705/28 |
| 2003/0014314 A1* | 1/2003 | Griep | ............... | G06Q 50/12 705/15 |
| 2010/0161383 A1* | 6/2010 | Butler | ............... | G06Q 10/103 705/28 |
| 2012/0265728 A1* | 10/2012 | Plattner | ............... | G06Q 10/08 707/607 |
| 2015/0052019 A1* | 2/2015 | Field-Darraugh | ... | G06Q 10/087 705/26.62 |
| 2015/0097840 A1 | 4/2015 | Nishimura et al. | | |
| 2018/0322425 A1* | 11/2018 | DeHart | ............... | G06Q 10/087 |
| 2020/0027042 A1* | 1/2020 | DeHart | ............... | G06Q 10/0631 |
| 2020/0051181 A1 | 2/2020 | Moritomo et al. | | |
| 2020/0150636 A1 | 5/2020 | Matsuya et al. | | |

FOREIGN PATENT DOCUMENTS

| | | |
|---|---|---|
| JP | 2020-027374 A | 2/2020 |
| WO | 2019/064892 A1 | 4/2019 |

OTHER PUBLICATIONS

Khaswala et al, (Value network mapping: Visualization and Analysis of Multiple Flows in Value Stream Maps), Proceedings of the Lean Management Solutions Conference, St. Louis, MO, Sep. 1011, 2001 (Year: 2001).*

Japanese Office Action dated Nov. 2, 2021 for Japanese Patent Application No. 2020-048918.

* cited by examiner

FIG. 4

PRODUCTION PAST RECORD TABLE
351

| PRODUCT ID | TIME POINT | STEP ID | STATUS |
|---|---|---|---|
| id0001 | 2019-04-12 11:29:00 | 1 | START |
| id0001 | 2019-04-12 12:43:00 | 1 | END |
| ... | ... | ... | ... |

FIG. 5

ORDER-OF-STEP TABLE
353

| PRODUCT TYPE ID | PRODUCT ID | ORDER OF STEPS |
|---|---|---|
| X | 0011, ... | 3, 1, 2 |
| Y | 0012, ... | 5, 1, 2 |
| Z | 0501, ... | 2, 3, 4 |
| W | 0201, ... | 2, 5, 4, 6 |

FIG. 6

RETENTION PAST RECORD TABLE
352

| TIME POINT | STEP ID / 601 | PREVIOUS STEP ID / 602 | SUB RETENTION NUMBER / 603 | SUB RETENTION INCREASE RATE / 604 | SUB RETENTION INCREASE ACCELERATION RATE / 605 | RETENTION NUMBER / 606 | RETENTION INCREASE RATE / 607 | RETENTION INCREASE ACCELERATION RATE / 608 |
|---|---|---|---|---|---|---|---|---|
| ⋮ | ⋮ | ⋮ | ⋮ | ⋮ | ⋮ | ⋮ | ⋮ | ⋮ |
| January 1, 2020 10:00am | 1 | 3 | 5 | -1 | 0 | 15 | -3 | 0 |
|  |  | 4 | 10 | -2 | 0 |  |  |  |
|  | 2 | 1 | 8 | +3 | 0 | 8 | +3 | 0 |
| ⋮ | ⋮ | ⋮ | ⋮ | ⋮ | ⋮ | ⋮ | ⋮ | ⋮ |
| January 1, 2020 11:00am | 1 | 3 | 2 | -3 | -2 | 14 | -1 | +2 |
|  |  | 4 | 12 | +2 | +4 |  |  |  |
|  | 2 | 1 | 8 | 0 | -3 | 8 | 0 | -3 |
| ⋮ | ⋮ | ⋮ | ⋮ | ⋮ | ⋮ | ⋮ | ⋮ | ⋮ |

Note: column 609 is RETENTION INCREASE ACCELERATION RATE.

FIG. 10

| RETENTION INCREASE RATE | ACCELERATION ABNORMALITY DEGREE (RETENTION INCREASE ACCELERATION RATE) | IMPACT LEVEL | DESCRIPTION |
|---|---|---|---|
| POSITIVE | INCREASE | HIGH | RETENTION NUMBER IS INCREASING RAPIDLY |
| POSITIVE | DECREASE | LOW | RETENTION NUMBER IS INCREASING BUT BECOMING STABILIZED |
| POSITIVE | NO CHANGE | MEDIUM | RETENTION NUMBER IS INCREASING |
| NEGATIVE | INCREASE | LOW | RETENTION NUMBER IS DECREASING BUT BECOMING STABILIZED |
| NEGATIVE | DECREASE | HIGH | RETENTION NUMBER IS DECREASING RAPIDLY |
| NEGATIVE | NO CHANGE | MEDIUM | RETENTION NUMBER IS DECREASING |
| 0 | INCREASE | LOW | RETENTION NUMBER STARTED TO INCREASE |
| 0 | DECREASE | LOW | RETENTION NUMBER STARTED TO DECREASE |
| 0 | NO CHANGE | NONE | NO PROBLEM |

FIG. 11

| RETENTION VOLUME | RETENTION INCREASE RATE | DISPLAY MODE | DISPLAY MODE NOTE |
|---|---|---|---|
| LARGE | POSITIVE | | FLASH IF ACCELERATION RATE INCREASES |
| LARGE | 0 | | |
| LARGE | NEGATIVE | | FLASH IF ACCELERATION RATE INCREASES |
| PROPER | POSITIVE | | |
| PROPER | 0 | | |
| PROPER | NEGATIVE | | FLASH IF ACCELERATION RATE INCREASES |
| SMALL | POSITIVE | | |
| SMALL | 0 | | |
| SMALL | NEGATIVE | | FLASH IF ACCELERATION RATE INCREASES |

# SYSTEM AND METHOD FOR SUPPORTING PRODUCTION MANAGEMENT

CROSS-REFERENCE TO PRIOR APPLICATION

This application relates to and claims the benefit of priority from Japanese Patent Application number 2020-48918, filed on Mar. 19, 2020 the entire disclosure of which is incorporated herein by reference.

BACKGROUND

The present invention relates generally to a computer technique for supporting production management.

As a technique for supporting production management, the visualization technique disclosed in Document 1 is known for example. In the technique disclosed in Document 1, for each product, start time points of a plurality of steps are coupled with lines and end time points of the plurality of steps are coupled with lines.

Document 1: Japanese Patent No. 6287018

SUMMARY

Holistically viewing a production situation makes it possible to make an estimate of abnormal locations. Accordingly, holistically viewing the production situation contributes to support for production management.

A production system is known in which a plurality of different product types of products are loaded and the sequential order of two or more of a plurality of steps is different depending on the product type, for example, a job shop production system or a cell production system. In such a production system, the same facility is used for two or more types of products in at least one step. In production control, it is desirable to maintain, for each facility, a constant operational availability of the facility.

In production, "stocks in work queue (retention stocks)" occurs in each step. A step for handling a lot of stocks in work queue potentially causes unnecessary and wasted stocks. In such a case, for example, the administrator can consider adopting a method of increasing the number of facilities for the corresponding step in order to reduce the stocks in work queue. On the other hand, when there is no stock in work queue, it may result in wasted time for facilities because work cannot be started. In such a case, for example, the administrator can consider adopting a method of increasing the facilities in a step immediately before the corresponding step in order to increase the number of products entering the corresponding step.

Accordingly, it is conceivable that a support for management of the appropriateness of the facility operational availability is to see the appropriateness of a retention number (the number of stocks in work queue) from a higher perspective, for example, to visualize the appropriateness of the retention number at each time point in each step.

However, the visualization of the appropriateness of the retention number is not always appropriate. An example of the reasons is at least one of the following.

Some stocks in work queue may be prepared intentionally. However, when an intended retention number exceeds a reference value (threshold), the intended retention number will be detected as abnormality.

When there is no fluctuation in the retention number after the retention number exceeds the reference value, it seems as if the abnormality continues.

The abnormality can be detected when the retention number exceeds the reference value, while the cause of the abnormality may be present before the retention number reaches the reference value. However, no abnormality is detected even when the cause of the retention number reaching the reference value is present early.

The appropriate value of the retention number is not necessarily the same in all steps. Thus, it is difficult to set a suitable reference value for the retention number.

Production past record information that is information as past records showing the execution time point of each step is accumulated for each product loaded into a production system. A support system calculates, for each step, a retention increase rate at each time point on the basis of the production past record information. For each step, the "retention increase rate" is an amount of increase in retention number per unit time. The support system displays a holistic chart for a production situation. The holistic chart is a chart with a time axis (axis corresponding to time) and a step axis (axis perpendicular to the time axis and corresponding to steps). A display mode of each position in the holistic chart depends on whether a retention increase rate for the time point and step corresponding to the position is a negative value, zero, or a positive value, and a difference between the retention increase rate and a rate reference value (a reference value for the retention increase rate).

According to the present invention, the "retention increase rate" at each time point in each step, that is, a ratio between IN (input amount of products between time points) and OUT (output amount of products between time points) at each time point for each step is calculated. When the ratio between IN and OUT for each facility is maintained constant, it can be estimated that the facility operational availability is maintained high. Therefore, making it possible to holistically view the appropriateness of the retention increase rate supports the management of the appropriateness of the facility operational availability.

BRIEF DESCRIPTION OF THE DRAWINGS

FIG. 4 shows an example of a production past record table;
FIG. 5 shows an example of an order-of-step table;
FIG. 6 shows an example of a retention past record table;
FIG. 10 shows examples of a relationship among a rate abnormality degree, an acceleration rate abnormality degree, and an influence degree;
FIG. 11 shows examples of a relationship between a combination of a retention number, a rate abnormality degree, and ab acceleration rate abnormality degree, and a display mode.

DESCRIPTION OF EMBODIMENTS

Figure 1:
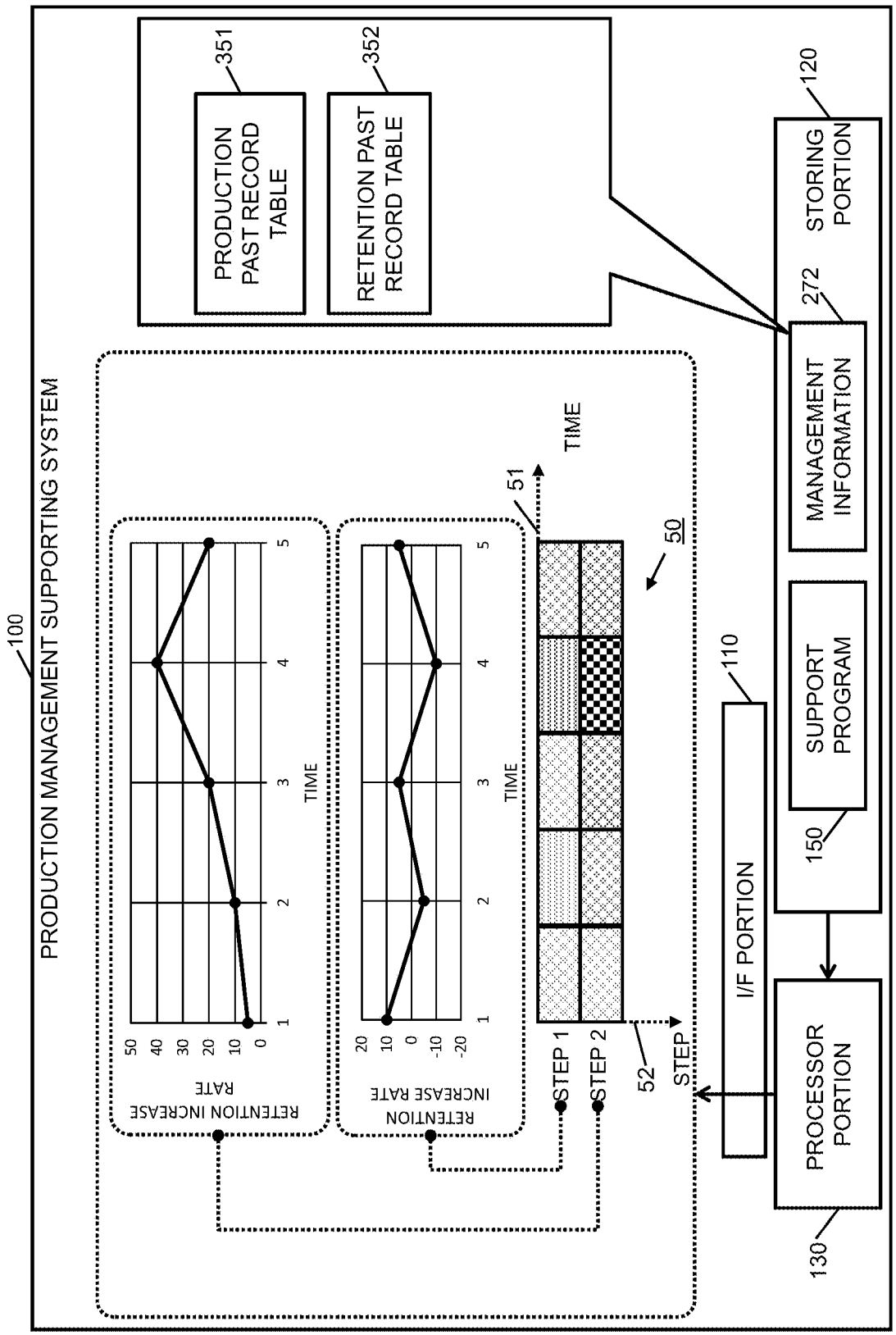
FIG. 1 shows the outline of an embodiment.

In the following description, an "interface portion" includes one or more interfaces. The one or more interfaces may include at least one of a user interface portion and a communication interface portion. The user interface portion may include at least one I/O device among one or more I/O devices (e.g., input devices (e.g., a keyboard and a pointing device) and an output device (e.g., a display device)) and a display computer or may include an interface device for the at least one I/O device. The communication interface portion may include one or more communication interface devices. The one or more communication interface devices may be one or more communication interface devices of the same type (i.e., one or more network interface cards (NICs)) or two or more communication interface devices of different types (e.g., a NIC and a host bus adapter (HBA)).

In the following description, a "storing portion" includes one or more memories. At least one of the memories associated with the storing portion may appropriately be a volatile memory. The storing portion is used mainly during a process performed by the processor portion. The storing portion may also include, in addition to the memories, one or more nonvolatile storing devices (e.g., hard disk drives (HDDs) or solid state drives (SSDs)).

In the following description, the "processor portion" includes one or more processors. At least one of the processors is typically a microprocessor such as a central processing unit (CPU), but the processors may also include a processor of another type such as graphics processing unit (GPU). Each of the one or more processors may be a single-core processor or a multi-core processor. The processors may also include a hardware circuit which performs a part or the whole of a process.

In the following description, a process may be described using a "program" as a subject. Since a program performs a determined process by being executed by the processor portion, while appropriately using the storing portion (e.g., memory), the interface portion (e.g., communication port), and/or the like, the subject of the processor may also be the processor. The process described using the program as the subject may also be a process performed by the processor portion or an apparatus having the processor portion. The processor portion may also include a hardware circuit (e.g., field-programmable gate array (FPGA) or an application specific integrated circuit (ASIC)) which performs a part or the whole of the process. The program may also be installed from a program source to an apparatus such as a computer. The program source may be, e.g., a program distribution server or a recording medium (e.g., non-transitory recording medium) which is readable by the computer. In the following description, two or more programs may be implemented as one program or one program may be implemented as two or more programs.

In the following description, information may be described using such an expression as "a xxx table", but the information may be expressed using any data structure. Specifically, to show that the information does not depend on any data structure, "a xxx table" can be referred to also as "xxx information". Also, in the following description, a configuration of each table is exemplary. One table may be divided into two or more tables or all or any of two or more tables may be one table.

In the following description, a "production management supporting system" may be configured to include one or more computers. Specifically, when, e.g., a computer has a display device and displays information on the display device thereof, the computer may appropriately be the production management supporting system. Alternatively, when, e.g., a first computer (e.g., management server) transmits information to be displayed to a remote second computer (display computer (e.g., management client)) and the display computer displays the information (when the first computer displays the information on the second computer), at least the first computer of the first and second computers may appropriately be the production management supporting system. The production management supporting system may also have an interface portion, a storing portion, and a processor portion coupled to the interface portion and the storing portion. The "display of information to be displayed" by the computer in the production management supporting system may be the display of information to be displayed on the display device of the computer or may also be the transmission of the information to be displayed from the computer to the display computer (in the latter case, the display computer displays the information to be displayed). The function of at least one of the management server in the production management supporting system and the production management supporting system may also be implemented by a virtual computer (e.g., virtual machine (VM)) implemented by at least one physical computer (e.g., a physical calculation resource on a cloud basis). At least a portion of the production management supporting system may be software-defined.

A "product" generally means a produced item, i.e., a finished product. However, in the following description, the "product" means each of the items loaded in a production system. Accordingly, in the following description, the "product" may be any of an item before loaded into the production system, an item currently in the production system (i.e., "semi-finished product"), and a finished product in a shippable state through all the corresponding steps in the production system.

In the following description, the step immediately before a step can be referred to as the "previous step", and the step immediately after a step can be referred to as the "subsequent step". Similarly, the time point immediately before a time point can be referred to as the "previous time point", and the time point immediately after a time point can be referred to as "subsequent time point".

Also, in the following description, the step of a step ID x (x is a natural number) may be referred to as a "step x", while an inter-step range between the step x and a step y may be referred to as an "inter-step range x-y". The step y is typically the subsequent step of the step x. In addition, in the following description, an interval between a time point j and a time point k may be sometimes referred to as a "time point interval j-k".

In some cases in the following description, in the case where the same type of components are described without being distinguished, a common part of symbols is used. In the case where the same type of components are distinguished, symbols are used. For example, when previous relation objects are not discriminated from each other, each of the previous relation objects may be referred to as a "previous relation object 13". When the previous relation objects are discriminated for each other, each of the previous relation objects may be referred to as a "previous relation object 13A" or a "previous relation object 13B".

FIG. 1 shows the outline of an embodiment. Note that, in the following description, "UI", which stands for user interface, typically refers to a graphical user interface (GUI).

A production management supporting system 100 has an I/F (interface) portion 110, a storing portion 120, and a processor portion 130 coupled to the I/F portion 110 and the storing portion 120. The storing portion 120 stores management information 272 and a support program 150. The processor portion 130 executes the support program 150.

The management information 272 includes a production past record table 351 and a retention past record table 352. The production past record table 351 is a table of past records showing the execution time point of each product loaded in the production system in each step. The retention past record table 352 is a table indicating retention past records calculated on the basis of the production past record table 351. Some of the management information 272 may be information collected from facilities in the production system or information input by a user (e.g., a worker or an administrator).

The support program 150 calculates, for each step, a retention increase rate at each time point on the basis of the production past record table 351. For each step, the "retention increase rate" is an example of at least a part of the retention past records, and is an amount of increase in retention number (the number of stocks in work queue) per unit time. For each of steps 1 and 2 of a plurality of steps, the retention increase rate for each time point (in other words, the retention increase rate in time series) is as shown in the graph of FIG. 1.

The support program 150 displays a holistic chart 50 for a production situation. The holistic chart 50 is a chart with a time axis 51 (axis corresponding to time) and a step axis 52 (axis perpendicular to the time axis and corresponding to steps). A display mode of each position in the holistic chart 50 depends on whether a retention increase rate for the time point and step corresponding to the position is a negative value, zero, or a positive value, and a difference between the retention increase rate and a rate reference value (a reference value for the retention increase rate).

The "retention increase rate" at each time point in each step, that is, a ratio between IN (input amount of products between time points) and OUT (output amount of products between time points) at each time point for each step is used as an evaluation index for facility operational availability. When the ratio between IN and OUT for each facility is maintained constant, it can be estimated that the facility operational availability is maintained high. Visualizing the appropriateness of the retention increase rate for each time point for each step supports the management of the appropriateness of the facility operational availability.

The production past record table 351 is also a table in which information collected from facilities in the production system is recorded. The information recorded in the production past record table 351 includes all information necessary for calculating a retention number for each time point in each step. In the present embodiment, the retention increase rate for each time point in each step is calculated. However, the calculation of the retention increase rate does not require to prepare new information other than the information necessary for calculating the retention number. This is because, for each time point in each step, a difference between the retention number at that time point and the retention number at a time point immediately from (typically, immediately before) that time point can be calculated as the retention increase rate. In this way, according to the present embodiment, it is possible to support the management of the appropriateness of the facility operational availability without new additional information other than the information necessary for calculating the retention number.

The reference values for retention numbers are not necessarily the same in all steps, while the rate reference value may be common to a plurality of steps but the maximum value and the minimum value of the retention increase rate may differ depending on the steps. This is because the best ratio between IN and OUT does not depend on the steps. Specifically, for example, the rate reference value may be zero. In other words, the rate reference value may be a value that complies with a simple reference that the number of products going out is the same number of products coming in. In this way, setting the rate reference value is easy.

As an example of the holistic chart 50, a heat map illustrated in FIG. 1 can be adopted. Note that differences in the display mode of cells in the heat map may typically be differences in color, but in the drawings, differences in pattern and density is adopted for easy understanding.

The holistic chart 50 has a plurality of cells as an example of a plurality of positions. The holistic chart 50 corresponds to a cell matrix. Each of the plurality of cells is an example of a display object. A cell row corresponds to a step, and a cell column corresponds to a time. The display mode of each cell depends on the retention increase rate for the time point and step corresponding to the cell. The difference in display mode may be expressed in any method such as a difference in color, a difference in density, a difference in pattern, the presence or absence of blinking, or a combination of two or more of these elements. A threshold X may be set, for example, in the management server program 271, as a threshold for the difference (hereinafter, the rate abnormality degree) between the retention increase rate and the rate reference value. The threshold X may be also common to a plurality of steps. The threshold X may be any value. The display mode may be determined by the support program 150 according to the magnitude of the difference between the rate abnormality degree and the threshold X. Note that thresholds X may be prepared separately, such as a threshold for negative retention increase rates and a threshold for positive retention increase rates, but in the present embodiment, the threshold X is one common value. The threshold X may be a threshold for the absolute value of the rate abnormality degree. As a result, it is possible to detect whether the retention increase rate is too high or the retention increase rate is too low.

In the holistic chart 50 illustrated in FIG. 1, the horizontal axis is the time axis and the vertical axis is the step axis. For each cell, no pattern means that the retention increase rate is zero (in the present embodiment, retention increase rate=rate reference value=0).

For example, a horizontal striped pattern means that the retention increase rate is a negative value. The density of the horizontal striped pattern means the magnitude of the rate abnormality degree between the negative retention increase rate and the rate reference value, in other words, the relative relationship between the rate abnormality degree and the threshold X. The horizontal striped pattern is, for example, darker as the absolute value of the rate abnormality degree is higher (darkest for the absolute value of the rate abnormality degree exceeding the threshold X).

Also, for example, a checkered pattern means that the retention increase rate is a positive value. The density of the checkered pattern means the magnitude of the rate abnormality degree between the positive retention increase rate and the rate reference value, in other words, the relative relationship between the absolute value of the rate abnormality degree and the threshold X. The checkered pattern is, for example, darker as the absolute value of the rate abnormality degree is higher (darkest for the absolute value of the rate abnormality degree exceeding the threshold X).

The following will describe the present embodiment in detail. Note that in the present embodiment, as an element that is adopted as an evaluation index for production control and affects the display of the holistic chart 50, there is given a "retention increase acceleration rate" in addition to the "retention increase rate". The "retention increase acceleration rate" is an amount of increase in the retention increase rate per unit time. Each of the "retention increase rate" and the "retention increase acceleration rate" will be described in detail in the description of the present embodiment.

Figure 2:
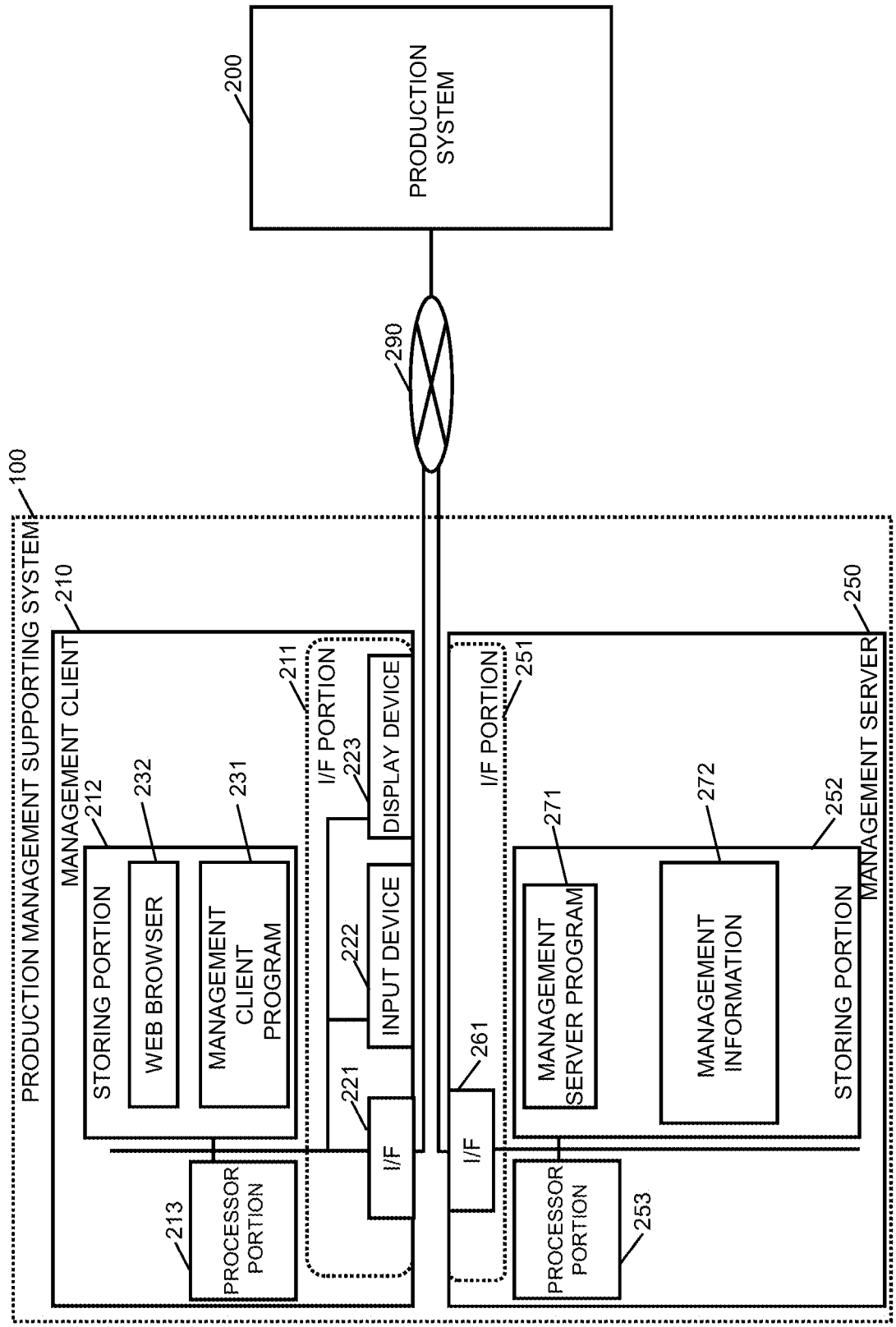
FIG. 2 shows a configuration of a production management supporting system according to the embodiment.

FIG. 2 shows a configuration of the production management supporting system 100.

The production management supporting system 100 includes a management server 250 and one or more management clients 210 coupled to the management server 250. To the management server 250, each of the management clients 210 and a production system 200 is coupled via a communication network (e.g., a local area network (LAN), a wide area network (WAN), or the Internet) 290.

The production system 200 is a production system (e.g., a factory) in which a plurality of different product types of products are loaded and the sequential order of two or more of a plurality of steps is different depending on the product type, and is, for example, a job shop production system or a cell production system. The production system 200 includes a plurality of facilities (apparatuses) for a plurality of steps, a plurality of sensors which regularly perform measurement for a plurality of measurement items with regard to the plurality of steps, and a server which stores a plurality of measurement values regularly obtained using the plurality of sensors and transmits the plurality of measurement values to the management server 250. From the production system 200, information (raw data such as, e.g., production dynamic state data, facility data, and quality measurement data) is regularly or irregularly transmitted to the management server 250 and stored in the management server 250. For example, the information includes, for each product, a product ID, and the start time point and the end time point of each step. Note that the production system 200 may be a production system other than the production systems described above (e.g., a job shop production system or a cell production system), for example, a line production system.

The management client 210 has an I/F portion 211, a storing portion 212, and a processor portion 213 coupled to the I/F portion 211 and the storing portion 212.

The I/F portion 211 includes an I/F (communication interface device coupled to the communication network 290) 221, an input device (e.g., pointing device or keyboard) 222, and a display device (device having a physical screen which displays information) 223. A touch screen integrally including the input device 222 and the display device 223 may also be adopted.

The storing portion 212 stores a computer program executed by the processor portion 213 and information used by the processor portion 213. Specifically, for example, the storing portion 212 stores a management client program 231 and a Web browser 232. The management client program 231 communicates with the management server 250 and displays a UI such as the cost heat map 11 described above via the Web browser 232.

The management server 250 has an I/F portion 251, a storing portion 252, and a processor portion 253 coupled to the I/F portion 251 and the storing portion 252.

The I/F portion 251 includes an I/F (communication interface device coupled to the communication network 290) 261.

The storing portion 252 stores a computer program executed by the processor portion 253 and information used by the processor portion 253. Specifically, for example, the storing portion 252 stores a management server program 271 and management information 272. The management server program 271 communicates with the management client program 231. The management information 272 may include information related to a past record such as the start time point and the end time point of each of the steps for each product loaded in the production system 200. The management information 272 may include the raw data mentioned above. Also, the management information 272 may include, for example, information generated on the basis of a result of analyzing information related to a past record, and various thresholds.

Through a cooperative process performed by the management server program 271, the management client program 231, and the Web browser 232, the display of the UI such as the holistic chart 50 is implemented.

The relationships between the components shown in FIG. 2 and the components shown in FIG. 1 are, e.g., as follows. Specifically, of the I/F portions 211 and 251, at least the I/F portion 251 corresponds to the I/F portion 110. Of the storing portions 212 and 252, at least the storing portion 252 corresponds to the storing portion 120. Of the processor portions 213 and 253, at least the processor portion 253 corresponds to the processor portion 130. Of the management server program 271, the management client program 231, and the Web browser 232, at least the management server program 271 corresponds to the support program 150.

Figure 3:
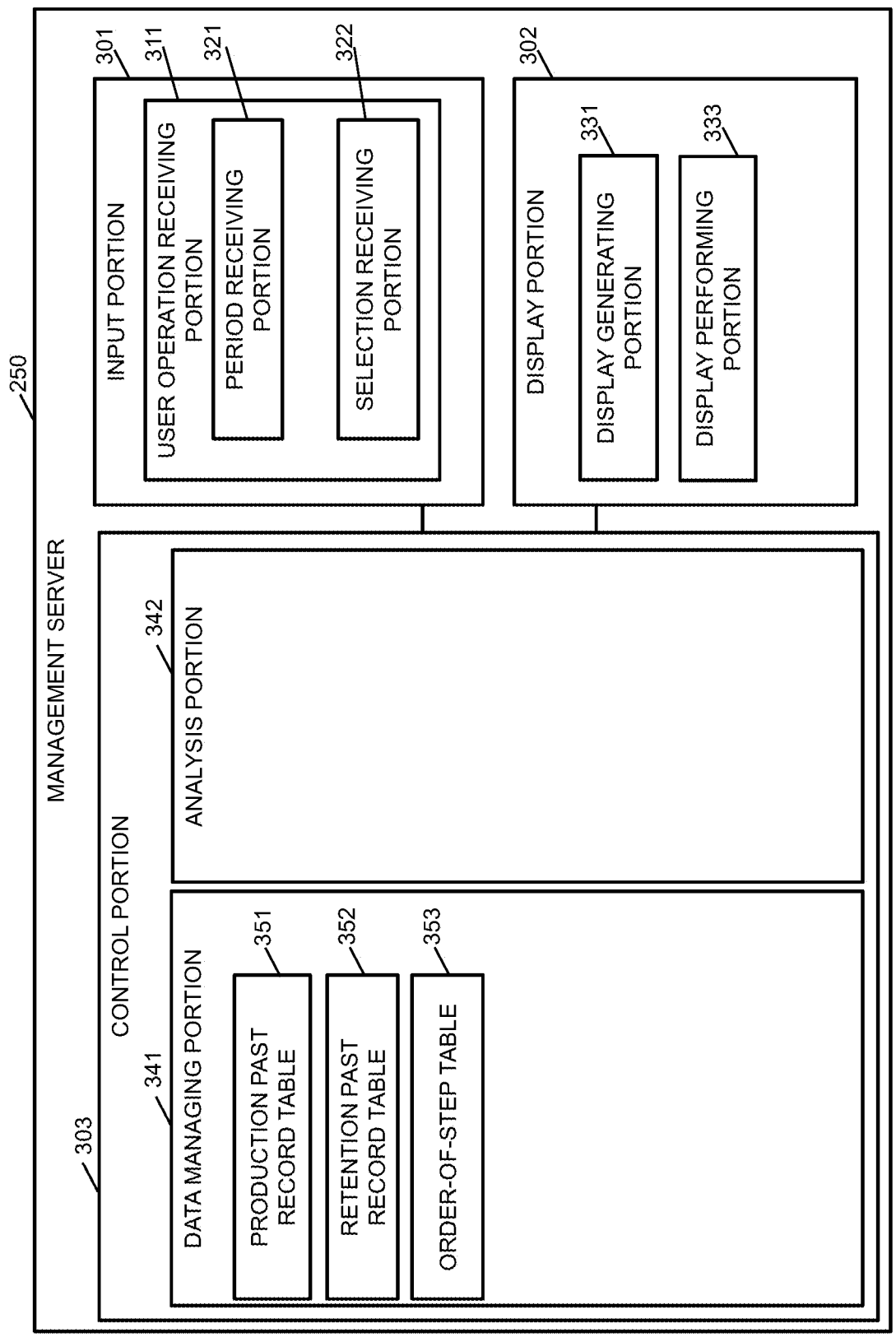
FIG. 3 shows an example of functions implemented in a management server.

FIG. 3 shows an example of the functions implemented in the management server 250.

The management server program 271 is executed by the processor portion 253 to allow the illustrated functions, i.e., an input portion 301, a display portion 302, and a control portion 303 to be implemented. In other words, the management server program 271 has the input portion 301, the display portion 302, and the control portion 303.

The input portion 301 is the function for receiving information. The input portion 301 includes a user operation receiving portion 311. The user operation receiving portion 311 is a function for receiving a user operation (operation performed on the UI by the user using the input device). The user operation receiving portion 311 includes a period receiving portion 321 and a selection receiving portion 322. The period receiving portion 321 is a function for receiving a specification of a display target period in a holistic chart described later. The selection receiving portion 322 is a function for receiving a selection operation (e.g., a user operation for selecting an element desired by the user).

The display portion 302 is a function for displaying information. The display portion 302 includes a display generating portion 331 and a display performing portion 333. The display generating portion 331 is a function for generating the display of a UI such as the holistic chart 50 (e.g., drawing it on a memory portion). The display performing portion 333 is a function for performing the display of the generated UI.

The control portion 303 is a function for control. The control portion 303 includes a data managing portion 341 and an analysis portion 342.

The data management portion 341 manages information included in the management information 272, for example, a production past record table 351, a retention past record table 352, and an order-of-step table 353. For example, the data management portion 341 acquires a past record data of a product, a worker, and a facility and updates at least a part of the management information 272 (e.g., the production past record table 351) on the basis of the past record data. Note that the "past record data" is data showing the past record of production and including, e.g., a product ID (e.g., product number), a step ID (e.g., step number), a time point (e.g., the collection time point of the data or the start time point and the end time point of the step), and a status (showing that, e.g., a process is currently performed in the step or the step was ended). For example, the data managing portion 341 regularly or irregularly collects the past record data from the production system 200 and updates at least a portion of the management information 272.

The analysis portion 342 is a function for analyzing the management information 272.

The following will describe an example of a table included in the management information 272.

FIG. 4 shows an example of the production past record table 351.

In the production past record table 351, each record stores information such as a product ID 401, a time point 402, a step ID 403, and a status 404. The product ID 401 indicates the ID of a product. The time point 402 indicates the execution time point (start time point or end time point of execution) of a step for the product. Also, the unit of time point is represented in a year/month/day/hour/minute/second unit, but the unit of a time point may be rougher or finer than the unit used in the present embodiment or may also be represented in a different unit. The step ID 403 indicates the ID of a step performed on the product. The status 404 indicates the status of the step performed on the product (e.g., "start" of the step or "end" of the step).

FIG. 5 shows an example of the order-of-step table 353.

The order-of-step table 353 shows the relationship between a product type and a sequential order of steps. Specifically, the order-of-step table 353 has records for individual product types on a one-to-one basis. Each record stores information such as a product type ID 501, a product ID 502, and an order of steps 503. One product type is taken as an example (which is the "product type of interest" in the description of FIG. 5).

The product type ID 501 indicates the ID of the product type of interest. The product ID 502 indicates the product ID of each product belonging to the product type of interest. The order of steps 503 indicates step IDs arranged in the sequential order of the steps for the product type of interest.

FIG. 6 shows an example of the retention past record table 352.

The retention past record table 352 has records for individual times on a one-to-one basis. In the present embodiment, the retention number, the increase rate, and the increase acceleration rate for each time point in each step are calculated by the management server program 271 on the basis of the production past record table 351 and the order-of-step table 353. Specifically, the record for each time point includes information such as a time point 601 as well as a step ID 602, a previous step ID 603, a sub retention number 604, a sub retention increase rate 605, a sub retention increase acceleration rate 606, a retention number 607, a retention increase rate 608, and a retention increase acceleration rate 609. Such pieces of information 601 to 609 are stored by the management server program 271. Hereinafter, one time point and one step will be taken as an example (the "time point of interest" and the "step of interest" in the description of FIG. 6).

The time point 601 indicates the time point of interest. The step ID 602 indicates the ID of the step of interest. The previous step ID 603 indicates the ID of a previous step (the step immediately before) of the step of interest. The ID of the previous step can be specified from the order-of-step table 353 by using the ID of the step of interest as a key. In the example shown in FIG. 6, the previous steps of step 1 are step 3 and step 4, and the subsequent step of step 1 is step 2. In other words, products of different product types enter step 1 from step 3 and step 4, and those products exit from step 1 to step 2.

The sub retention number 604, the sub retention increase rate 605, and the sub retention increase acceleration rate 606 are given for each set of the step ID 602 and the previous step ID 603. The sub retention number 604 indicates the retention number of products that enter the step of interest from the previous step of the step of interest. The sub retention increase rate 605 is an amount of increase in the retention number (sub retention number 604) of the products entering the step of interest from the previous step of the step of interest per unit time (time point interval), in other words, a value obtained by subtracting the sub retention number 604 at the previous time point of the time point of interest from the sub retention number 604 at the time point of interest. The sub retention increase acceleration rate 606 is an amount of increase in the retention increase rate (sub retention increase rate 605) of the products entering the step of interest from the previous step of the step of interest per unit time, in other words, a value obtained by subtracting the sub retention increase rate 605 at the previous time point of the time point of interest from the sub retention increase rate 605 at the time point of interest.

The retention number 607, the retention increase rate 608, and the retention increase acceleration rate 609 are given for each step of interest regardless of the number of previous steps given for the step of interest. The retention number 607 indicates the retention number of products that enter the step of interest from all the previous steps of the step of interest, in other words, a sum of all the sub retention numbers 604 corresponding to the time point of interest and the step of interest. The retention increase rate 608 indicates an amount of increase in the retention number of products that enter the step of interest from all the previous steps of the step of interest per unit time, in other words, a sum of all sub retention increase rates 605 corresponding to the time point of interest and the step of interest. The retention increase acceleration rate 609 indicates an amount of increase in the retention increase rate of products that enter the step of interest from all the previous steps of the step of interest per unit time, in other words, a sum of all sub retention increase acceleration rate 606 corresponding to the time point of interest and the step of interest.

Note that, in the present embodiment, the time point interval is constant (e.g., one hour), but the time point interval may not necessarily be constant (e.g., the time point interval may be different depending on the time zone). The "time point interval" is an interval between the time point and the latest time point (e.g., immediately before or immediately after that time point).

Hereinafter, a holistic chart according to a comparative example will be described, and then a holistic chart according to the present embodiment will be described in detail.

Figure 7:
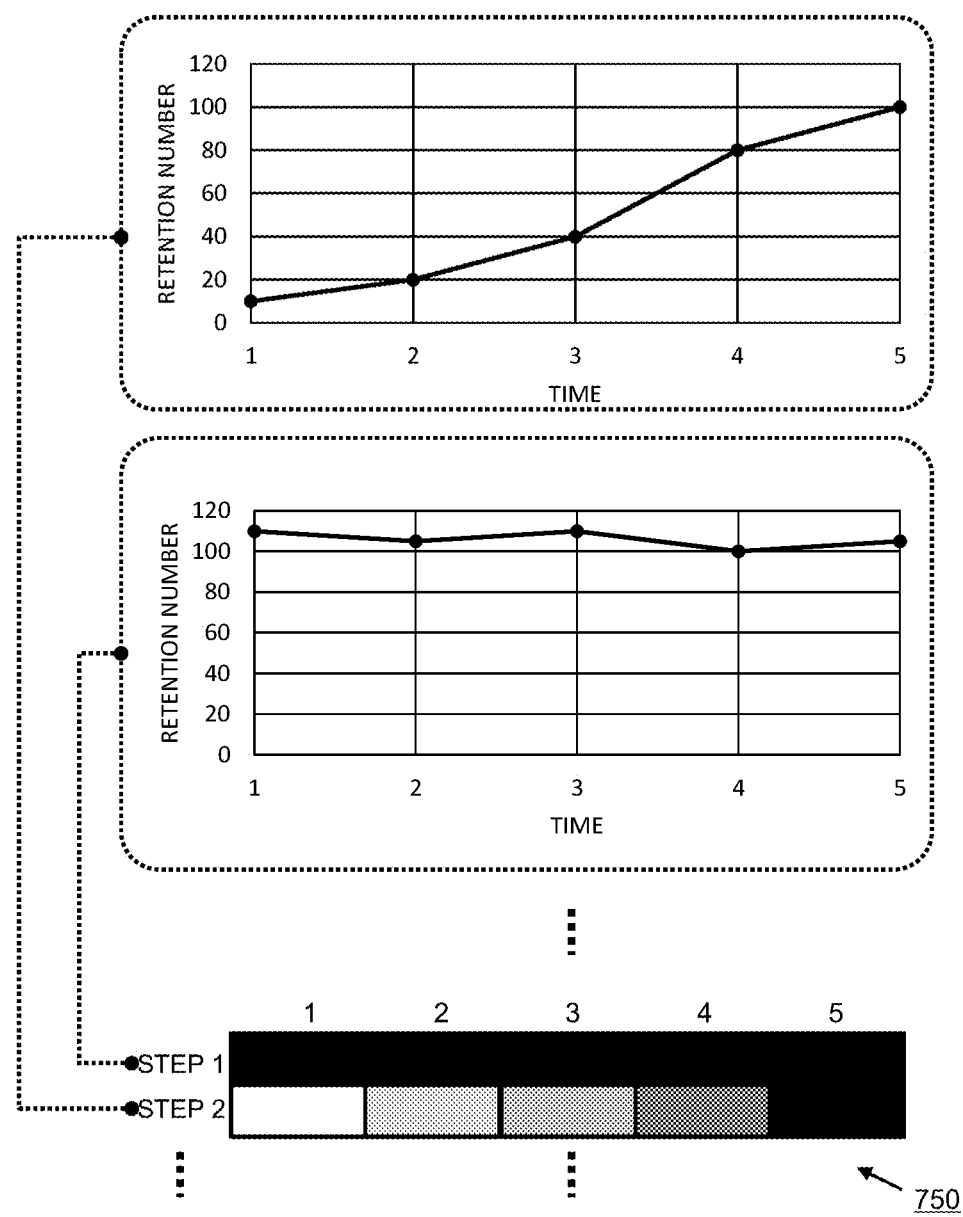
FIG. 7 shows a holistic chart according to a comparative example.

FIG. 7 shows the holistic chart according to the comparative example.

A holistic chart 750 according to the comparative example is a heat map showing the appropriateness of the retention number for each time point in each step. Accordingly, the display mode of each cell in the holistic chart 750 depends on the retention number. Each cell is darker as the retention number is larger, and is lighter as the retention number is smaller.

However, holistically viewing the appropriateness of the retention number has the following problems, for example.

Problem A: Some stocks in work queue may be prepared intentionally. However, when an intended retention number exceeds a reference value (threshold), the intended retention number will be detected as abnormality (e.g., it is turned into the darkest display).

Problem B: When there is no fluctuation in the retention number after the retention number exceeds the reference value, it seems as if the abnormality continues. For example, for step 1, all the cells are turned into the darkest display, and it looks as if the abnormality continues.

Problem C: The abnormality can be detected when the retention number exceeds the reference value, while the cause of the abnormality may be present before the retention number reaches the reference value. However, no abnormality is detected even when the cause of the retention number reaching the reference value is present early. For example, for step 2, the retention number monotonically increased and then exceeded the reference value at time point 5, but it is not known when the change causing the retention number to exceed the reference value occurred.

Problem D: The appropriate value of the retention number is not necessarily the same in all steps. Thus, it is difficult to set a suitable reference value for the retention number.

According to the present embodiment, it is possible to solve problems related to a holistic view of the appropriateness of the retention number, for example, any of the above-mentioned Problem A to Problem D. Hereinafter, the details of the holistic chart according to the present embodiment will be described with reference to FIG. 8 and subsequent figures.

Figure 8:
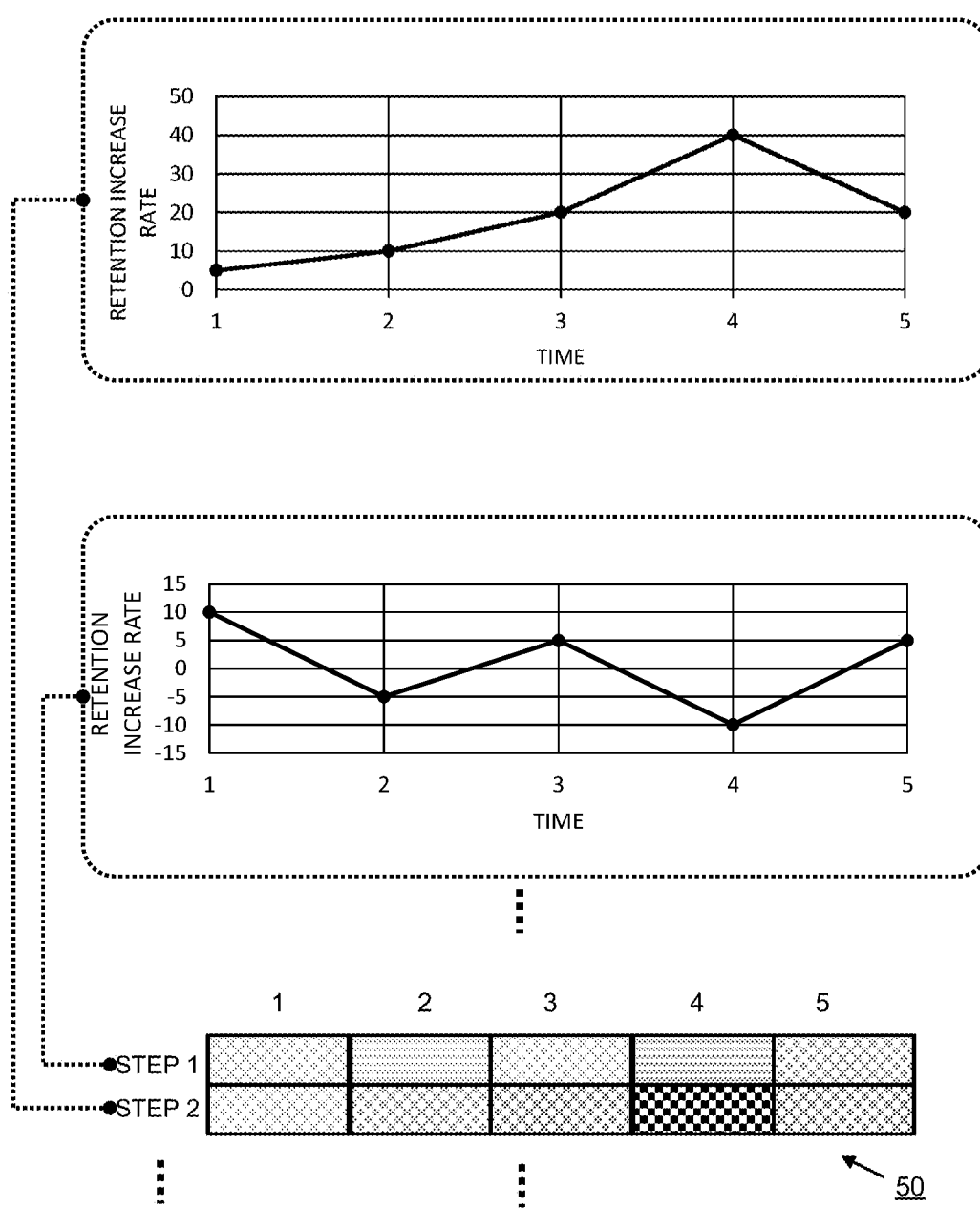
FIG. 8 shows a first example of a holistic chart according to an embodiment.

FIG. 8 shows a first example of the holistic chart according to the present embodiment.

A holistic chart 50 is a heat map for the retention increase rate. The display mode of each cell in the holistic chart depends on the retention increase rate. For example, the pattern of each cell depends on whether the retention increase rate is a negative value, zero, or a positive value, and the density of each cell depends on the rate abnormality degree. As described above, the "rate abnormality degree" is a difference between the retention increase rate (the absolute value in the present embodiment) and the rate reference value.

Specifically, for example, the pattern of cells having a negative retention increase rate is a horizontal striped pattern, and the density of the horizontal striped pattern depends on the rate abnormality degree (the higher the rate abnormality degree, the darker). The pattern of cells having a retention increase rate of zero is no pattern. The pattern of cells having a positive retention increase rate is a checkered pattern, and the density of the checkered striped pattern depends on the rate abnormality degree (the higher the rate abnormality degree, the darker).

As described above, in the present embodiment, the "retention increase rate" at each time point in each step, that is, a balance between IN (input amount of products between time points) and OUT (output amount of products between time points) at each time point for each step is used as an evaluation index for production control. When the ratio between IN and OUT for each facility is maintained constant, it can be estimated that the facility operational availability is maintained high. Visualizing the appropriateness of the retention increase rate for each time point for each step supports the management of the appropriateness of the facility operational availability.

For example, the cell row for step 1 in the holistic chart 50 illustrated in FIG. 8 shows that gradual decrease and increase in the retention increase rate are repeated, that is, the retention number is almost constant in the display target period. Therefore, even if the time series of the retention number in step 1 is as illustrated in FIG. 7, it is found that there is no problem in the facility operational availability in step 1 in the display target period shown in the holistic chart 50. Thus, the above-mentioned Problem A and Problem B are solved.

Also, for example, the cell row for step 2 in the holistic chart 50 illustrated in FIG. 8 shows that the positive retention increase rate tends to increase, and the rate abnormality degree exceeds the threshold X at time point 4. In the present embodiment, as will be described later, since the rate reference value is zero, the rate abnormality degree can be regarded as the retention increase rate itself. After time point 4, although the retention increase rate decreases, the retention increase rate is a positive value, and therefore the retention number itself increases. As a result, the retention number exceeds the reference value at time point 5 (see FIG. 7). However, in the example shown in FIG. 8, an abnormality (that the rate abnormality degree exceeds the threshold X) is detected at time point 4 before time point 5. In this way, it is possible to early detect a sign of the retention number exceeding. As a result, the above-mentioned Problem C is solved.

The "rate reference value" is a reference value for the retention increase rate, that is, a reference for a ratio between IN and OUT for products. The ratio is preferably balanced in order not to increase the retention number, and such an idea about the ratio does not depend on the steps. Therefore, the rate reference value can be made common to a plurality of steps (typically, all steps), and in the simplest case, the rate reference value can be set to zero. For this reason, the threshold X can be made common to a plurality of steps (typically, all steps). Therefore, the above-mentioned Problem D is also solved.

As described above, the calculation of the "retention increase rate" can be performed using the same information as the existing information necessary for calculating the retention number for each time point in each step. In other words, it is not necessary to prepare new additional information that is not necessary for calculating the retention number for each time point in each step. For example, in order to solve the above-mentioned Problem A to Problem D, a method of repeating trial and error by increasing the information items to be used or increasing the information items to be newly collected in the so-called big data is considered. However, such a method is complicated and burdensome. According to the present embodiment, no new information is required, which contributes to saving the storage resources of the computer.

As described above, the new evaluation index of "retention increase rate" contributes to the support for production control.

Extensive research conducted on the holistic chart serving as a heat map for the retention increase rate can provide the following further knowledge. It is expected that a sign that the retention number will be in an inappropriate state can be provided to the user earlier by changing the display mode even for a relatively high rate abnormality degree depending on whether the retention increase rate is increasing in the direction of deterioration or increasing in the direction of mitigation, or changing the display mode even for a relatively low rate abnormality degree depending on whether the retention increase rate is decreasing in the direction of deterioration or decreasing in the direction of mitigation.

To this end, a new evaluation index other than the "retention increase rate" can be introduced.

In addition, it is desirable to calculate such a new evaluation index without requiring new information, as with the "retention increase rate".

Therefore, in the present embodiment, the above-mentioned "retention increase acceleration rate" is also adopted as an evaluation index indicating a tendency of increase or decrease in the retention increase rate. The "retention increase acceleration rate" is an amount of increase in the retention increase rate per unit time. The management server program 271 calculates a retention increase acceleration rate for each time point in each step on the basis of the production past record table 351 and the order-of-step table 353. An example of a specific calculation method is as described with reference to FIG. 6.

Figure 9:
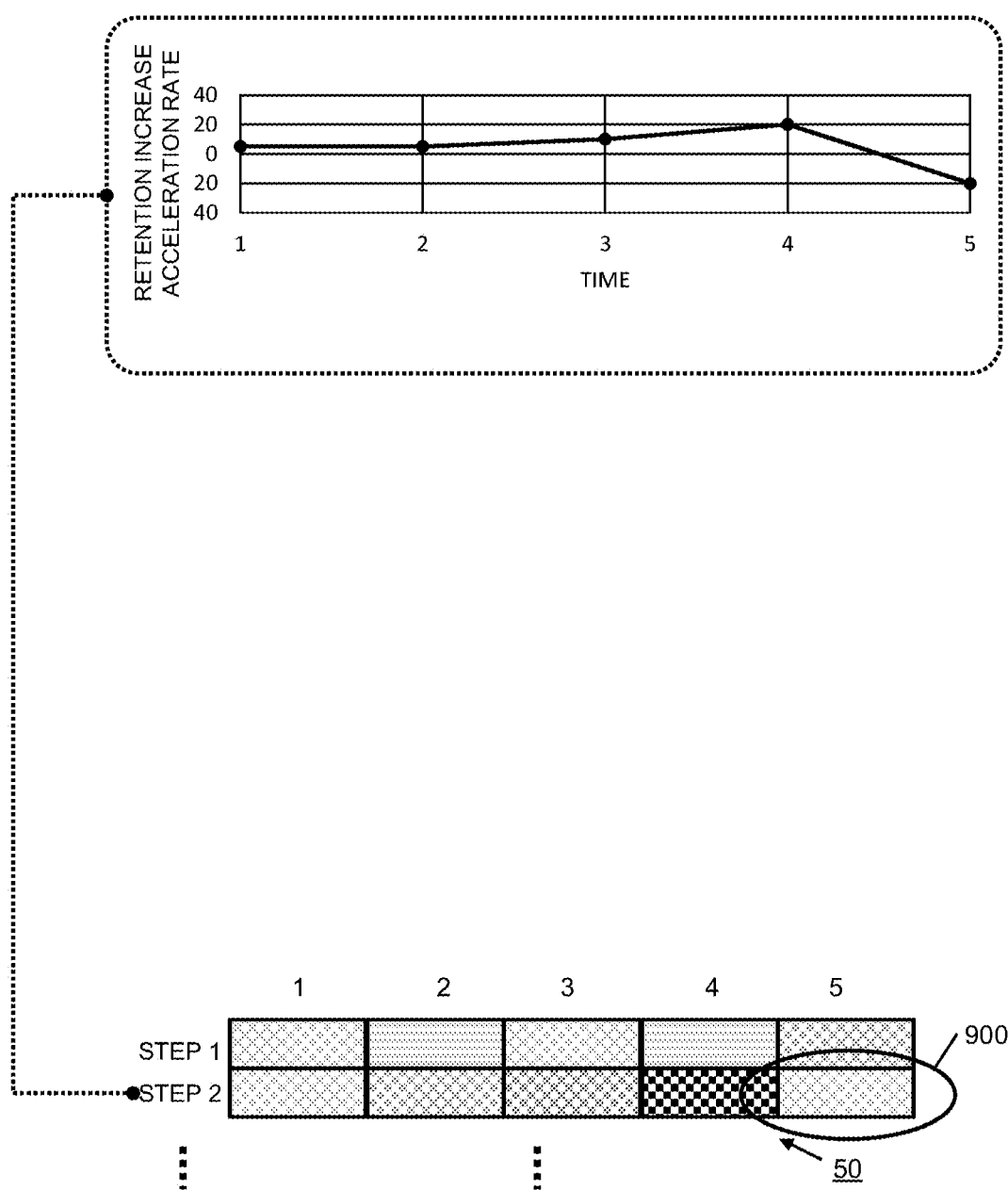
FIG. 9 shows a second example of the holistic chart according to the embodiment.

FIG. 9 shows a second example of the holistic chart according to the present embodiment.

A holistic chart 50 is a heat map for the retention increase rate and the retention increase acceleration rate. The display mode of each cell in the holistic chart 50 depends on the retention increase rate and the retention increase acceleration rate. For example, the pattern of each cell depends on whether the retention increase rate is a negative value, zero, or a positive value, and the density of each cell depends on at least an acceleration rate abnormality degree of the rate abnormality degree and the acceleration rate abnormality degree. The "acceleration rate abnormality degree" is a difference between the retention increase acceleration rate and an acceleration rate reference value. The "acceleration rate reference value" is a reference value (threshold) for the retention increase acceleration rate, that is, a reference for a ratio between an amount of increase in IN (input amount of products between time points) and an amount of increase in OUT (output amount of products between time points). The ratio is preferably balanced, and such an idea about the ratio does not depend on the steps. Therefore, the acceleration rate reference value can be made common to a plurality of steps (typically, all steps), and in the simplest case, the acceleration rate reference value can be set to zero.

For ease of explanation, time point 5 and step 2 are focused on, as indicated by reference numeral 900 in FIG. 9. According to the time series of the retention increase acceleration rate in step 2, the retention increase acceleration rate gradually increases from time point 1 to time point 4, but rapidly decreases after time point 4. This means that the retention number is increasing as the retention increase rate is increasing, but it is stopping soon. Accordingly, as can be seen from the comparison between FIGS. 8 and 9, the management server program 271 sets the pattern of the cell corresponding to time point 5 and step 2 in the holistic chart 50 to a light pattern (reduces the density).

As described above, in addition to the elements described with reference to FIG. 8, the display mode of each cell in the holistic chart 50 depends on whether the retention increase acceleration rate corresponding to the cell is a negative value, zero, or a positive value, and a difference between the retention increase acceleration rate and the acceleration rate reference value.

More specifically, the display mode of each cell in the holistic chart 50 mainly depends on the retention increase rate and supplementally depends on the retention increase acceleration rate. In other words, the display mode of each cell in the holistic chart 50 depends on an influence degree defined by the following (x) to (z).
(x) Which of a negative value, zero, and a positive value is the retention increase rate?
(y) Rate abnormality degree
(z) Which of increase (deterioration), no change, and decrease (mitigation) is the tendency of increase or decrease in the acceleration rate abnormality degree?

FIG. 10 shows examples of a relationship among a rate abnormality degree, an acceleration rate abnormality degree, and an influence degree.

In FIG. 10, the influence degree has four levels: high, medium, low, and none. For each cell in the holistic chart 50, the pattern depends on whether the retention increase rate is a negative value, zero, or a positive value, and the density depends on the influence degree. The higher the influence degree, the higher the density.

Note that a threshold Y for the acceleration rate abnormality degree may be set in the management server program 271, for example. Thresholds Y may be prepared separately, such as a threshold for negative retention increase acceleration rates and a threshold for positive retention increase acceleration rates, but in the present embodiment, the threshold Y is one common value. The threshold Y may be a threshold for the absolute value of the acceleration rate abnormality degree. This makes it possible to detect both deterioration and mitigation of the retention increase acceleration rate. For example, when the acceleration rate abnormality degree is a positive value and the absolute value of the acceleration rate abnormality degree exceeds the threshold Y, the acceleration rate abnormality degree may be set to increase. When the acceleration rate abnormality degree is a negative value and the absolute value of the acceleration rate abnormality degree exceeds the threshold Y, the acceleration rate abnormality degree may be set to decrease. When the acceleration rate abnormality degree indicates neither deterioration nor mitigation, the acceleration rate abnormality degree may be set to no change. The threshold Y can be common to a plurality of steps (typically, all steps).

The display mode of each cell in the holistic chart 50 could mainly depend on the retention increase acceleration rate and could supplementally depend on the retention increase rate. For example, for each cell, the pattern could depend on whether the retention increase acceleration rate is a negative value, zero, or a positive value. However, as in the present embodiment, it is desirable that the retention increase rate be dominant rather than the retention increase acceleration rate. This is because it allows the user to recognize whether or not the retention number is increasing.

Also, the display mode of each cell in the holistic chart 50 may further depend on the retention number.

FIG. 11 shows examples of a relationship between a combination of a retention number, a rate abnormality degree, and ab acceleration rate abnormality degree, and a display mode.

In the example shown in FIG. 11, the pattern of each cell depends on whether the retention increase rate is a negative value, zero, or a positive value. The density of the cell depends on at least the retention number of the rate abnormality degree and the retention number. For example, when the retention number exceeds the first threshold, the density of the pattern is high. When the retention number is equal to or smaller than the first threshold and equal to or larger than the second threshold, the density of the pattern is medium. When the retention number is smaller than the second threshold, the density of the pattern is low. Also, whether or not the pattern blinks depends on whether or not the acceleration rate abnormality degree increases (deteriorates). Note that the threshold for the retention number may differ depending on the step.

Instead of the example shown in FIG. 11, the density of the cell may depend on at least the acceleration rate abnormality degree of the rate abnormality degree and the acceleration rate abnormality degree, and whether or not the pattern blinks may depend on the magnitude of the retention number.

Further extensive research conducted on the holistic chart serving as a heat map for the retention increase rate can provide the following further knowledge. As with a job shop production system, in a case where the production system 200 is a production system in which a plurality of different product types of products are loaded and the sequential order of two or more of a plurality of steps is different depending on the product type, the holistic chart shows no information on relations among a step of interest and steps before and after the step of interest (sequential relation).

Thus, in the present embodiment, the management server program 271 displays a display object showing a sequential relation of steps on the holistic chart 50.

Figure 12:
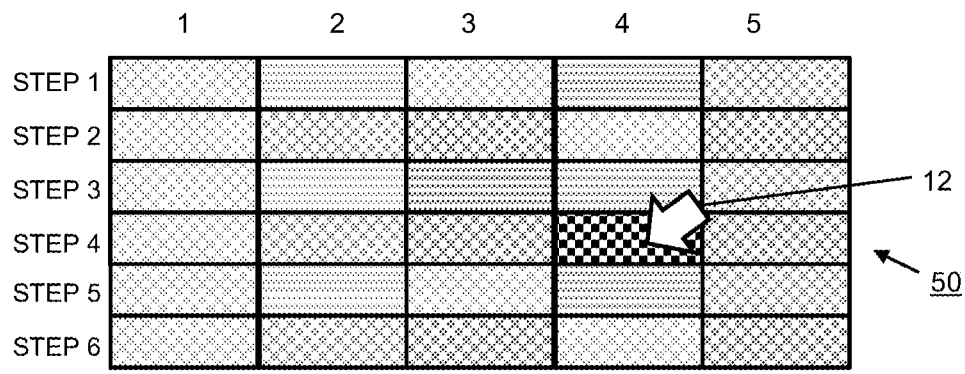
FIG. 12 shows an example of specification of any cell in the holistic chart.

For example, as illustrated in FIG. 12, it is assumed that the user specifies a cell corresponding to time point 4 and step 4 in the holistic chart 50.

In this case, the management server program 271 specifies the previous step and subsequent step of step 4 by referring to the order-of-step table 353 using step 4 as a key. Here, it is assumed that step 3 and step 5 are specified as the previous steps of step 4, and step 6 is specified as the subsequent step of step 4. The previous time point of time point 4 is time point 3 and the subsequent time point of time point 4 is time point 5. Here, the management server program 271 performs at least one of the following (a) and (b). Note that when there is no previous step or no subsequent step for the specified step for any product type, then (a) or (b) may not be performed.

(a) The management server program 271 displays, for each of one or more previous cells of the specified cell, a previous relation object 13 that is a display object showing the association between the previous cell and the specified cell. The "previous cell" is a cell corresponding to the previous time point and the specified previous step. In this example, the previous cells are a cell corresponding to time point 3 and step 3, and a cell corresponding to time point 3 and step 5. In the example shown in FIG. 13, each of previous relation objects 13A and 13B is a line having no directivity, but instead of such a line, a line having directivity (e.g., an arrow showing the sequential relation of the steps) or other display objects may be used.

(b) The management server program 271 displays, for each of one or more subsequent cells of the specified cell, a subsequent relation object 14 that is a display object showing the association between the subsequent cell and the specified cell. The "subsequent cell" is a cell corresponding to the subsequent time point and the specified subsequent step. In this example, the subsequent cell is a cell corresponding to time point 5 and step 6. In the example shown in FIG. 13, a subsequent relation object 14 is a line having no directivity, but instead of such a line, a line having directivity (e.g., an arrow showing the sequential relation of the steps) or other display objects may be used.

Figure 13:
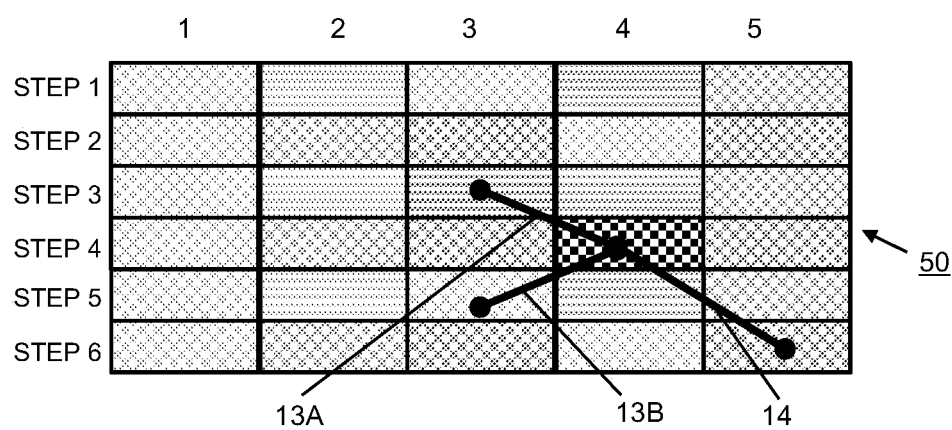
FIG. 13 shows a first example of a display of a relationship between a step to which the specified cell belongs and steps previous and subsequent to the step.

In the example shown in FIG. 13, the user can recognize the relation among the specified cell (time point 4 and step 4) and the steps before and after the specified cell.

In addition, for example, comparing the display mode of the specified cell with the display mode of the previous cell allows the user to estimate which of the previous cells corresponds to the step whose product output affects the rate abnormality degree (retention increase rate) at the time point and step which correspond to the specified cell. For example, since the pattern of the previous cell corresponding to step 3 is a horizontal striped pattern, the user can estimate that "at time point 3 and step 3, OUT is larger than IN, which is the cause of the retention increase rate at time point 4 and step 4 being a positive value."

In addition, for example, comparing the display mode of the specified cell with the display mode of the subsequent cell allows the user to estimate which of the subsequent cells corresponds to the time point and step whose rate abnormality degree (retention increase rate) is affected by the product output of the step corresponding to the specified cell. For example, since the pattern of the specified cell and the pattern of the subsequent cell are both horizontal striped patterns but the subsequent cell has a lighter pattern than the specified cell, the user can estimate that "at time point 4 and step 4, OUT is smaller than IN, which is the cause of the retention increase rate at time point 5 and step 6 being a positive value."

Figure 14:
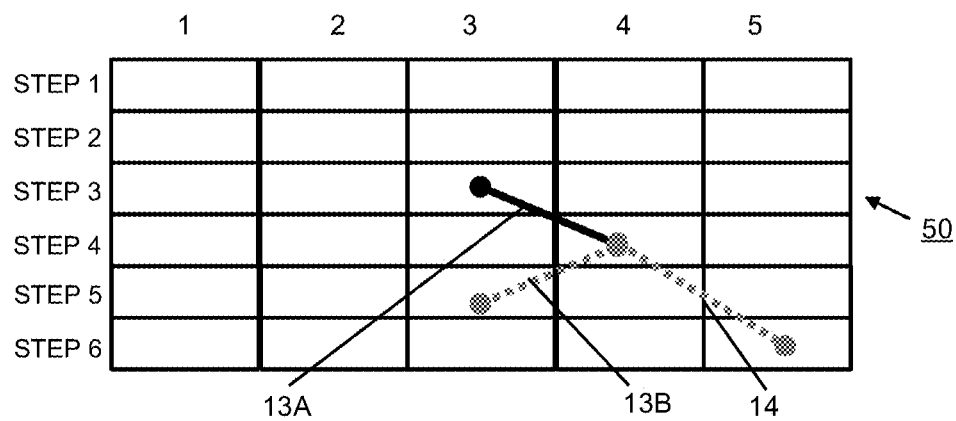
FIG. 14 shows a second example of a display of a relationship between a step to which the specified cell belongs and steps previous and subsequent to the step.

The management server program 271 may turn at least one of the previous relation objects 13 and the subsequent relation object 14 into a display mode depending on at least the retention increase rate of the retention increase rate and the retention increase acceleration rate in the time point interval and the inter-step range corresponding to the object as illustrated in FIG. 14, in response to a predetermined user operation (or automatically without the user operation). Note that the management server program 271 may turn the display mode of each cell in the holistic chart 50 into a uniform display mode (e.g., a display mode in no pattern and white) in order to improve the visibility of the display mode of the object. For each of the previous relation objects 13 and the subsequent relation object 14, the retention increase rate and the retention increase acceleration rate in the time point interval and the inter-step range corresponding to the object are specified from the retention past record table 352 using the time point interval and the inter-step range as keys.

For example, the display mode of at least one previous relation object 13 may depend on the sub retention increase rate for the inter-step range and the time point interval shown by the previous relation object 13. Specifically, for example, the display mode may depend on whether the sub retention increase rate is a negative value, zero, or a positive value, and a difference between the sub retention increase rate and its reference value. The display mode of the previous relation object 13 makes it easy for the user to estimate how much the product output of the previous time point and the previous step affects the rate abnormality degree at the specified time point and step. Note that a reference value serving as a threshold of the sub retention increase rate may be set in the management server program 271 for each inter-step range, for example.

In addition, for example, the display mode of at least one previous relation object may further depend on the sub retention increase acceleration rate for the inter-step range and the time point interval shown by the previous relation object 13. Specifically, for example, the display mode may depend on whether the sub retention increase acceleration rate is a negative value, zero, or a positive value, and a difference between the sub retention increase acceleration rate and its reference value. The display mode of the previous relation object 13 makes it easier for the user to estimate how much the product output of the previous time point and the previous step affects the rate abnormality degree at the specified time point and step. Note that a reference value serving as a threshold of the sub retention increase acceleration rate may be set in the management server program 271 for each inter-step range, for example.

In addition, for example, the display mode of at least one subsequent relation object 14 may depend on the sub retention increase rate for the inter-step range and the time point interval shown by the subsequent relation object 14. Specifically, for example, the display mode may depend on whether the sub retention increase rate is a negative value, zero, or a positive value, and a difference between the sub retention increase rate and its reference value. The display mode of the subsequent relation object 14 makes it easy for the user to estimate how much the product output of the specified time point and step affects the rate abnormality degree at the subsequent time point and the subsequent step.

Furthermore, for example, the display mode of at least one subsequent relation object 14 may further depend on the sub retention increase acceleration rate for the inter-step range and the time point interval shown by the subsequent relation object 14. Specifically, for example, the display mode may depend on whether the sub retention increase acceleration rate is a negative value, zero, or a positive value, and a difference between the sub retention increase acceleration rate and its reference value. The display mode of the subsequent relation object 14 makes it easier for the user to estimate how much the product output of the specified time point and step affects the rate abnormality degree at the subsequent time point and the subsequent step.

In the example shown in FIG. 14, with respect to the display mode of each of the previous relation objects 13 and the subsequent relation object 14, the line type depends on whether or not the sub retention increase rate is a positive value, and the line thickness depends on the absolute value of the sub retention rate.

Accordingly, for example, the previous relation object 13A with a dark solid line shows that the sub retention increase rate corresponding to the time point interval 3-4 and the inter-step range 3-4 is a positive value, and its absolute value is relatively large (e.g., larger than the reference value), that is, the sub retention number tends to increase. As a result, the user can estimate that the product output of time point 3 and step 3 has a great influence on the retention number at the specified time point 4 and step 4.

For example, the previous relation object 13B with a light broken line shows that the sub retention increase rate corresponding to the time point interval 3-4 and the inter-step range 5-4 is a negative value, and its absolute value is relatively small, that is, the sub retention number tends to decrease. As a result, the user can estimate that the product output of time point 3 and step 5 has a small influence on the retention number at the specified time point 4 and step 4.

Similarly, for example, the subsequent relation object 14 with a light broken line shows that the sub retention increase rate corresponding to the time point interval 4-5 and the inter-step range 4-6 is a negative value, and its absolute value is relatively small, that is, the sub retention number tends to decrease. As a result, the user can estimate that the product output of the specified time point 4 and step 4 has a small influence on the retention number at the subsequent time point 5 and the subsequent step 6.

Note that the display mode of each of the previous relation objects 13 and the subsequent relation object 14, for example, the thickness of the line may depend on the sub retention increase acceleration rate corresponding to the object.

Figure 15:
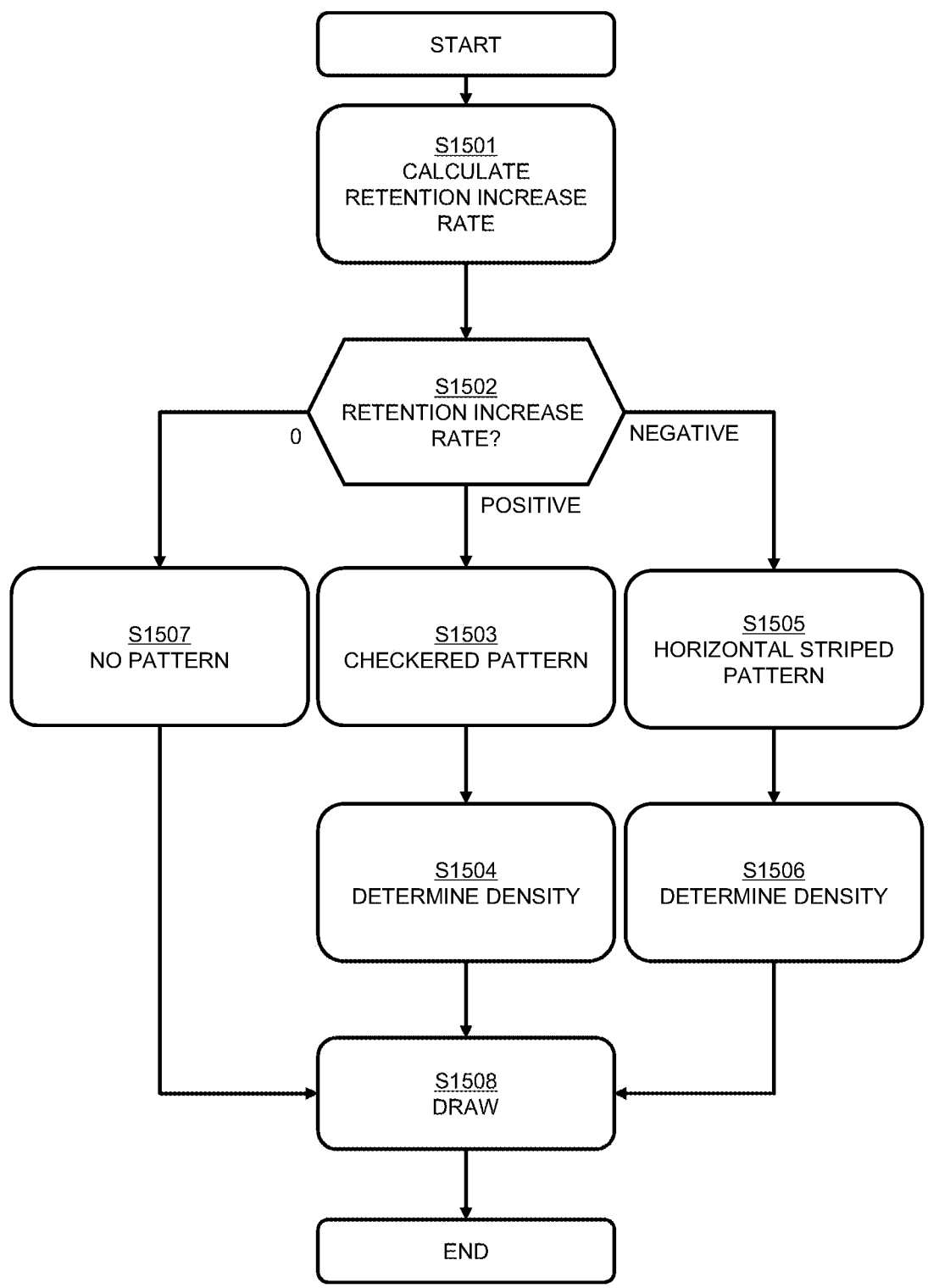
FIG. 15 shows a flow of a drawing process of a holistic chart for retention increase rate.
Figure 16:
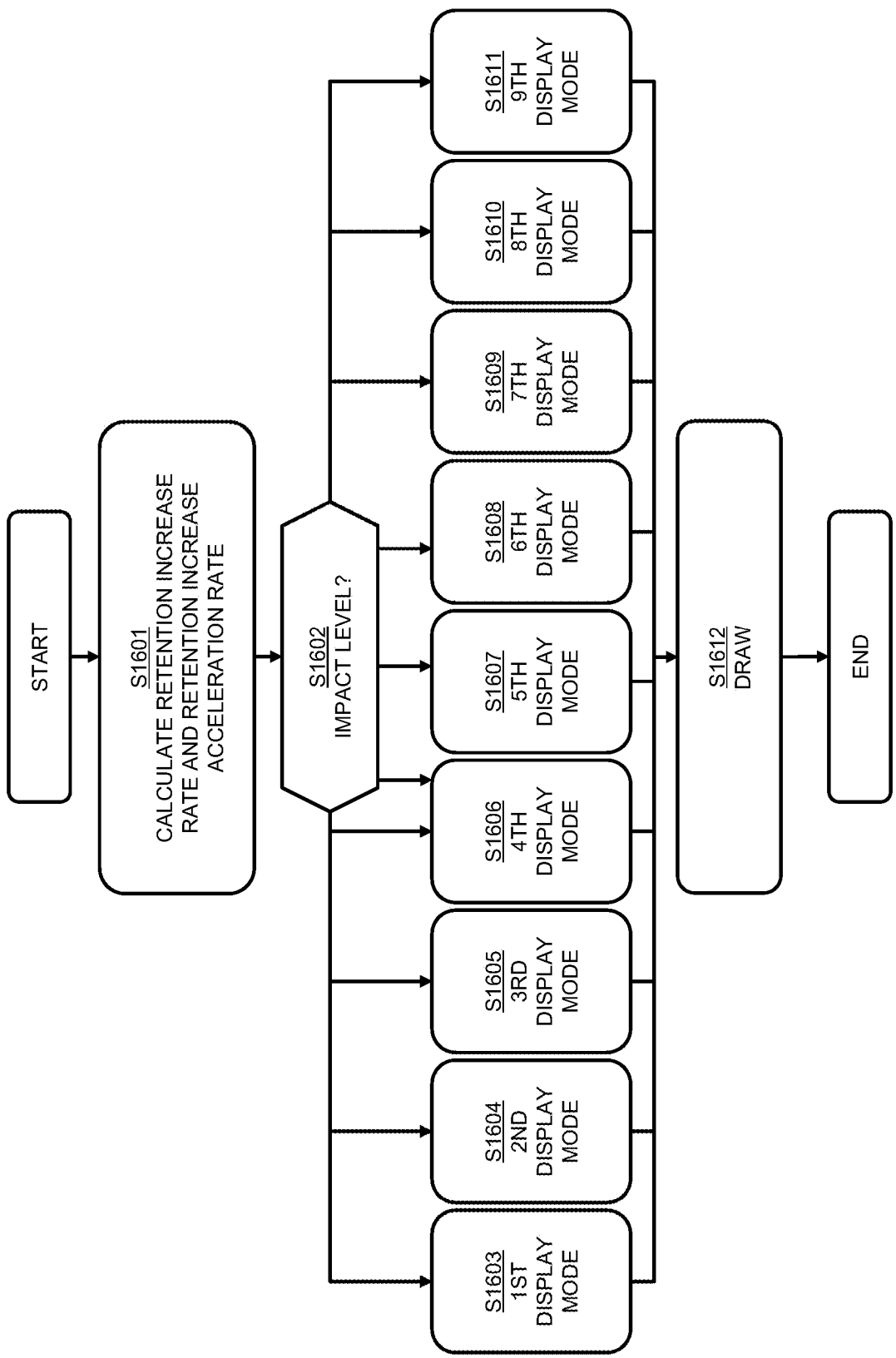
FIG. 16 shows a flow of a drawing process of a holistic chart for retention increase rate and retention increase acceleration rate.

The following will describe some examples of processing performed in the present embodiment. In the present embodiment, the management server program 271 receives, for example, through the UI, a specification of a holistic chart to be displayed for (A) retention increase rate, (B) retention increase rate and retention increase acceleration rate, or (C) retention increase rate, retention increase acceleration rate, and retention number. When (A) is specified, the processing flow shown in FIG. 15 is performed. When (B) is specified, the processing flow shown in FIG. 16 is performed. Note that the processing flow when (C) is specified is not illustrated, but those skilled in the art will appreciate that flow as referring to the description herein.

FIG. 15 shows a flow of a drawing process of a holistic chart for retention increase rate.

The management server program 271 calculates a retention increase rate for each time point in each step on the basis of the production past record table 351 and the order-of-step table 353 (S1501). The management server program 271 performs S1502 to S1507 for each set of time point and step. One time point and one step will be taken as an example (the time point of interest and the step of interest in the description of FIG. 15).

The management server program 271 determines whether the retention increase rate corresponding to the time point of interest and the step of interest is a negative value, zero, or a positive value (S1502).

When the retention increase rate is a positive value, the management server program 271 determines the pattern of the cell corresponding to the time point of interest and the step of interest to be a checkered pattern (S1503). Further, the management server program 271 determines the density of the pattern on the basis of the relationship between the threshold X and the rate abnormality degree (a difference between the retention increase rate and the rate reference value (=0)) (S1504). Here, the larger the absolute value of the rate abnormality degree (i.e., the absolute value of the retention increase rate), the higher the density.

When the retention increase rate is a negative value, the management server program 271 determines the pattern of cell corresponding to the time point of interest and the step of interest to be a horizontal striped pattern (S1505). Further, the management server program 271 determines the density of the pattern on the basis of the relationship between the threshold X and the rate abnormality degree (S1506). Here, the larger the absolute value of the rate abnormality degree (i.e., the absolute value of the retention increase rate), the lower the density.

When the retention increase rate is zero, the management server program 271 determines the pattern of the cell corresponding to the time point of interest and the step of interest to be no pattern (S1507).

The management server program 271 draws a cell of each set of time point and step on the basis of the results of S1503 to S1507 (S1508). As a result, the holistic chart 50 illustrated in FIG. 8 is drawn.

FIG. 16 shows a flow of a drawing process of a holistic chart for retention increase rate and retention increase acceleration rate.

The management server program 271 calculates a retention increase rate and a retention increase acceleration rate for each time point in each step on the basis of the production past record table 351 and the order-of-step table 353 (S1601). The management server program 271 performs S1602 to S1611 for each set of time point and step. One time point and one step will be taken as an example (the time point of interest and the step of interest in the description of FIG. 16). In the description of S1602 to S1611, FIG. 10 will be referred to as appropriate.

The management server program 271 determines the influence degree according to the retention increase rate and the retention increase acceleration rate corresponding to the time point of interest and the step of interest (S1602).

When the influence degree determined in S1602 is the first influence degree described in FIG. 10, the management server program 271 determines the display mode of the cell corresponding to the time point of interest and the step of interest to be a first display mode (S1603). According to the first display mode, the pattern is a checkered pattern, and the density of the pattern is high (e.g., the larger the absolute value of the retention increase acceleration rate, the higher the density).

When the influence degree determined in S1602 is the second influence degree described in FIG. 10, the management server program 271 determines the display mode of the cell corresponding to the time point of interest and the step of interest to be a second display mode (S1604). According to the second display mode, the pattern is a checkered pattern, and the density of the pattern is low (e.g., the smaller the absolute value of the retention increase acceleration rate, the lower the density).

When the influence degree determined in S1602 is the third influence degree described in FIG. 10, the management server program 271 determines the display mode of the cell corresponding to the time point of interest and the step of interest to be a third display mode (S1605). According to the third display mode, the pattern is a checkered pattern, and the density of the pattern is medium.

When the influence degree determined in S1602 is the fourth influence degree described in FIG. 10, the management server program 271 determines the display mode of the cell corresponding to the time point of interest and the step of interest to be a fourth display mode (S1606). According to the fourth display mode, the pattern is a horizontal striped pattern, and the density of the pattern is low.

When the influence degree determined in S1602 is the fifth influence degree described in FIG. 10, the management server program 271 determines the display mode of the cell corresponding to the time point of interest and the step of interest to be a fifth display mode (S1607). According to the fifth display mode, the pattern is a horizontal striped pattern, and the density of the pattern is high (e.g., the larger the absolute value of the retention increase acceleration rate, the higher the density).

When the influence degree determined in S1602 is the sixth influence degree described in FIG. 10, the management server program 271 determines the display mode of the cell corresponding to the time point of interest and the step of interest to be a sixth display mode (S1608). According to the sixth display mode, the pattern is a horizontal striped pattern, and the density of the pattern is medium.

When the influence degree determined in S1602 is the seventh influence degree described in FIG. 10, the management server program 271 determines the display mode of the cell corresponding to the time point of interest and the step of interest to be a seventh display mode (S1609). According to the seventh display mode, the pattern has no pattern, and the density of the cell is low.

When the influence degree determined in S1602 is the eighth influence degree described in FIG. 10, the management server program 271 determines the display mode of the cell corresponding to the time point of interest and the step of interest to be an eighth display mode (S1610). According to the eighth display mode, the pattern has no pattern, and the density of the pattern is low.

When the influence degree determined in S1602 is the ninth influence degree described in FIG. 10, the management server program 271 determines the display mode of the cell corresponding to the time point of interest and the step of interest to be a ninth display mode (S1611). According to the ninth display mode, the pattern has no pattern, and the density of the pattern is zero (e.g., the cell is white).

The management server program 271 draws a cell of each set of time point and step on the basis of the results of S1602 to S1611 (S1612). As a result, the holistic chart 50 illustrated in FIG. 9 is drawn.

Figure 17:
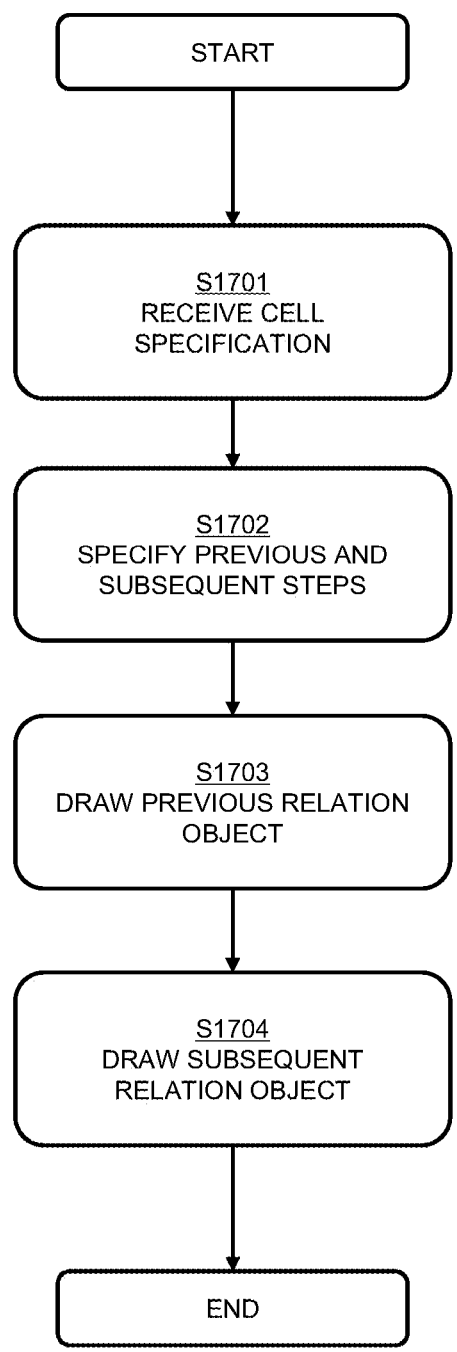
FIG. 17 shows a flow of a drawing process of a previous relation object and a subsequent relation object.

FIG. 17 shows a flow of a drawing process of a previous relation object and a subsequent relation object.

The management server program 271 receives a specification of a cell in the holistic chart 50 (S1701).

The management server program 271 specifies the previous step and subsequent step of the step to which the specified cell belongs from the order-of-step table 353 (S1702).

The management server program 271 draws, for each of all the previous cells of the specified cell, the previous relation object for connecting the previous cell and the specified cell on the holistic chart 50 (S1703). As described above, each previous cell is a cell belonging to the previous time point and previous step of the time point and step to which the specified cell belongs.

The management server program 271 draws, for each of all the subsequent cells of the specified cell, the subsequent relation object for connecting the subsequent cell and the specified cell on the holistic chart 50 (S1704). As described above, each subsequent cell is a cell belonging to the subsequent time point and subsequent step of the time point and step to which the specified cell belongs.

Figure 18:
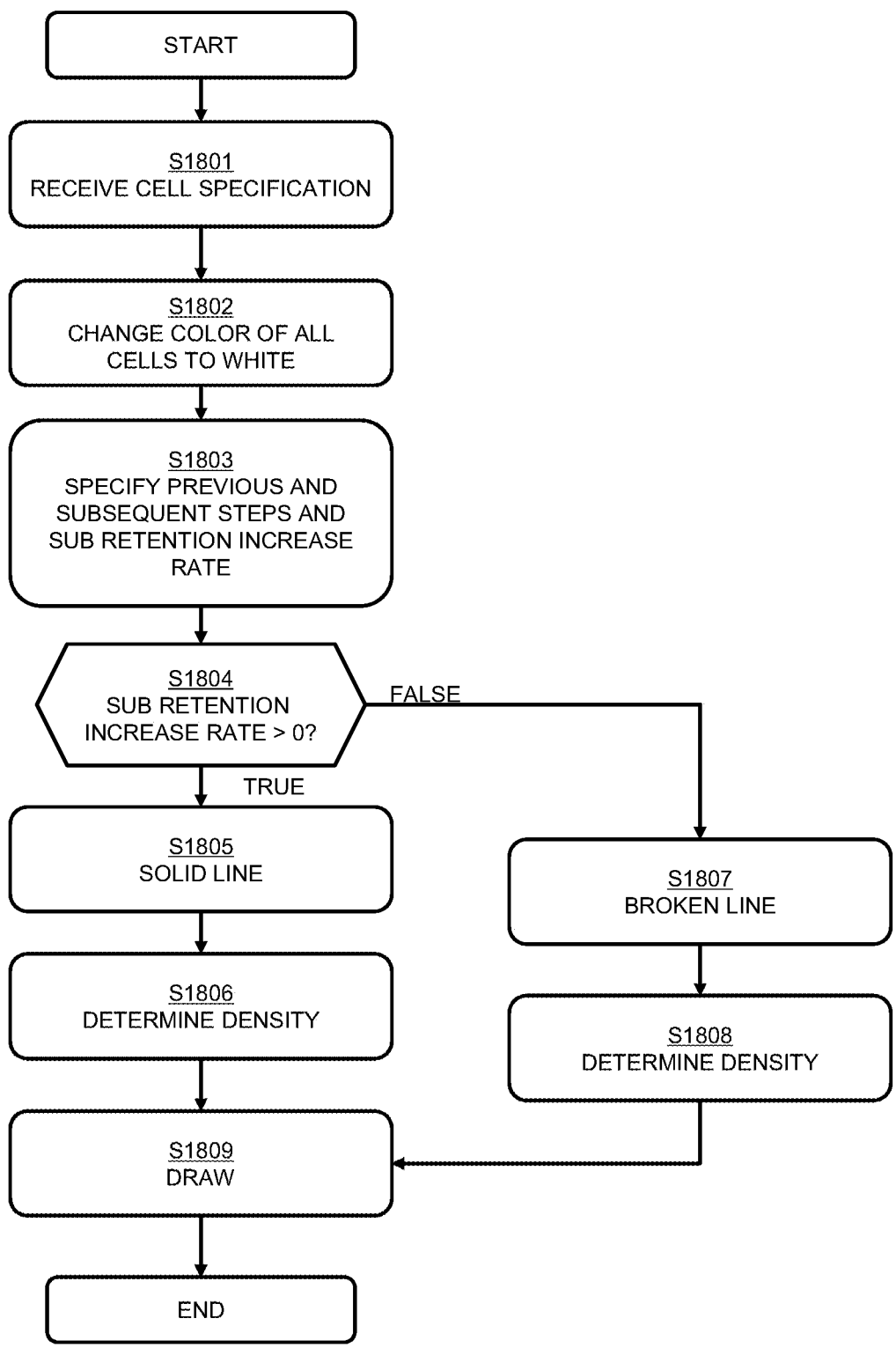
FIG. 18 shows a flow of a drawing process including control of display modes of the previous relation object and the subsequent relation object.

FIG. 18 shows a flow of a drawing process including control of display modes of the previous relation object and the subsequent relation object. Note that, in the example shown in FIG. 18, both the display modes of the previous relation object and the subsequent relation object depend on the sub retention increase rate but do not depend on the sub retention increase acceleration rate. However, both the display modes of the previous relation object and the subsequent relation object may depend on the sub retention increase acceleration rate in addition to the sub retention increase rate.

The management server program 271 receives a specification of a cell in the holistic chart 50 (S1801).

The management server program 271 changes the color of the display mode of all cells in the holistic chart 50 to white (an example of the default display mode) (S1802).

The management server program 271 specifies the previous step and subsequent step of the step to which the specified cell belongs from the order-of-step table 353, also refers to the retention past record table 352, and determines, for each set of the target time point interval and the target inter-step range, the sub retention increase rate (S1803). The management server program 271 performs S1804 to S1808 for each set of the target time point interval and the target inter-step range. One target time point interval and one target inter-step range will be taken as an example (in the description of FIG. 18, the target time point interval of interest and the target inter-step range of interest). Note that the "target time point interval" is between the time point to which the specified cell belongs and the previous time point or the subsequent time point. The "target inter-step range" is between the step to which the specified cell belongs and the previous step or the subsequent step.

The management server program 271 determines whether or not the sub retention increase rate corresponding to the target time point interval of interest and the target inter-step range of interest is higher than zero (S1804).

When the determination result of S1804 is true (S1804: TRUE), the management server program 271 determines the line type of the object corresponding to the target time point interval of interest and the target inter-step range of interest to be a solid line (S1805). Further, the management server program 271 determines the density of the object to be a density according to the absolute value of the sub retention increase rate (e.g., the larger the absolute value is, the darker the object is) (S1806).

On the other hand, when the determination result of S1804 is false (S1804: FALSE), the management server program 271 determines the line type of the object corresponding to the target time point interval of interest and the target inter-step range of interest to be a broken line (S1807). Further, the management server program 271 determines the density of the object to be a density according to the absolute value of the sub retention increase rate (e.g., the smaller the absolute value is, the lighter the object is) (S1808).

The management server program 271 draws an object for each set of the target time point interval and the target inter-step range on the basis of the results of S1804 to S1808 (S1809). As a result, the previous relation objects 13 and the subsequent relation object 14 illustrated in FIG. 14 are drawn.

While the embodiment of the present invention has been described heretofore, the embodiment is an example for describing the present invention and is not intended to limit the scope of the present invention to the embodiment. The present invention can be implemented even in various other forms.

We claim:

1. A production management supporting system that improves visibility of cells in a holistic chart, the production management supporting system comprising:
   a communication interface that receives data from a production system;
   a memory that stores a past record for a plurality of products, wherein the past record indicates an execution time point of individual steps for individual products loaded in the production system;
   a display; and
   a processor that is communicatively coupled to the communication interface, the memory and the display, wherein the processor is configured to:
   calculate a retention increase rate at each time point for the individual steps based on the past record for a particular product, wherein for each step, the retention increase rate is an amount of increase in a retention number which is a number of products in execution queue for a corresponding step, per unit time,
   calculate, a rate reference value which is a reference value for the retention increase rate that is common to a plurality of steps,
   generate, the holistic chart, wherein the holistic chart is for the particular product and has a time axis which is an axis corresponding to time, and a step axis which is an axis perpendicular to the time axis and corresponds to steps, and
   display, using the display, a user interface that includes the holistic chart, wherein the user interface changes a display mode of an individual cell in the holistic chart based on whether the retention increase rate corresponding to a time point and a step that corresponds to the individual cell is a negative value, zero, or a positive value, and a difference between the retention increase rate and the rate reference value.

2. The production management supporting system according to claim 1,
   wherein the processor is further configured to calculate:
   a retention increase acceleration rate at each time point for the individual steps based on the past record for the particular product,
   for each step, the retention increase acceleration rate is an amount of increase in the retention increase rate per unit time, and
   an acceleration rate reference value which is a reference value for the retention increase acceleration rate is common to the plurality of steps, and
   wherein the display mode of the cell in the holistic chart further depends on the retention increase acceleration rate corresponding to a time point and a step that correspond to the cell.

3. The production management supporting system according to claim 1, wherein
   the memory further stores management information includes order-of-step information that is information indicating a sequential order of steps, and
   the processor is further configured to:
   calculate, for each step, a retention increase rate for each set of the corresponding step and a previous step of the corresponding step, based on the past record for the particular product and the order-of-step information,
   perform, in response to receiving a specification of a position in the holistic chart from a user, at least one of:
   (a) displaying, for one or more previous positions of a specified position, previous relation objects that are display objects showing associations between the respective previous positions and the specified position; and
   (b) displaying, for one or more subsequent positions of the specified position, subsequent relation objects that are display objects showing associations between the respective subsequent positions and the specified position,
   for each of the previous positions, a time point corresponding to a corresponding previous position is a time point immediately before a time point corresponding to the specified position, and a step corresponding to the corresponding previous position is a step immediately before a step corresponding to the specified position, and for each of the subsequent positions, a time point corresponding to a corresponding subsequent position is a time point immediately after a time point corresponding to the specified position, and a step corresponding to the corresponding subsequent position is a step immediately after a step corresponding to the specified position.

4. The production management supporting system according to claim 3, wherein the display mode of at least one of the previous relation objects depends on the retention increase rate for an inter-step range and a time point interval shown by the at least one previous relation object.

5. The production management supporting system according to claim 4, wherein the processor is further configured to calculate:

a retention increase acceleration rate at each time point for the individual steps based on the past record for the particular product, for each step, the retention increase acceleration rate is an amount of increase in the retention increase rate per unit time, and an acceleration rate reference value which is a reference value for the retention increase acceleration rate is common to the plurality of steps, and wherein the display mode of the at least one previous relation object further depends on the retention increase acceleration rate for the inter-step range and the time point interval shown by the previous relation object.

6. The production management supporting system according to claim 3, wherein the display mode of at least one of the subsequent relation objects depends on the retention increase rate for an inter-step range and a time point interval shown by the at least one subsequent relation object.

7. The production management supporting system according to claim 6, wherein the processor is further configured to calculate: a retention increase acceleration rate at each time point for the individual steps based on the past record of the particular product, for each step, the retention increase acceleration rate is an amount of increase in the retention increase rate per unit time, and an acceleration rate reference value which is a reference value for the retention increase acceleration rate is common to the plurality of steps, and wherein the display mode of the at least one subsequent relation object further depends on the retention increase acceleration rate for the inter-step range and the time point interval shown by the at least one subsequent relation object.

8. The production management supporting system according to claim 1, wherein the display mode of the cell in the holistic chart further depends on the retention number corresponding to a time point and a step that correspond to the position.

9. The production management supporting system according to claim 2, wherein the display mode of the cell in the holistic chart further depends on the retention number corresponding to a time point and a step that correspond to the cell.

10. The production management supporting system according to claim 1, wherein the rate reference value is zero.

11. The production management supporting system according to claim 2, wherein the acceleration rate reference value is zero.

12. A method that improves visibility of cells in a holistic chart, the method comprising:

storing, by a processor, a past record for a plurality of products in a memory, wherein the past record indicates an execution time point of individual steps for individual products loaded in a production system;

calculating, by the processor using the memory, a retention increase rate at each time point for individual steps based on past record for a particular product, wherein for each step, the retention increase rate is an amount of increase in a retention number which is a number of products in execution queue for a corresponding step, per unit time;

calculating, by the processor, a rate reference value which is a reference value for the retention increase rate that is common to a plurality of steps;

generating, by the processor the holistic chart, wherein the holistic chart is for the particular product and has a time axis which is an axis corresponding to time, and a step axis which is an axis perpendicular to the time axis and corresponds to steps; and displaying, by the processor, a user interface including the holistic chart on a display, wherein the user interface changes a display mode of an individual cell in the holistic chart based on whether the retention increase rate corresponding to a time point and a step that corresponds to the individual cell is a negative value, zero, or a positive value, and a difference between the retention increase rate and the rate reference value.

13. A non-transitory computer readable storage medium storing instruction for improving visibility of cells in a holistic chart, the instructions, when executed by a processor cause the processor to execute a method comprising:

storing, by the processor, a past record for a plurality of products in a memory, wherein the past record indicates an execution time point of individual steps for individual products loaded in a production system;

calculating, by the processor using the memory, a retention increase rate at each time point for individual steps based on past record for a particular product, wherein for each step, the retention increase rate is an amount of increase in a retention number which is a number of products in execution queue for a corresponding step, per unit time;

calculating, by the processor, a rate reference value which is a reference value for the retention increase rate that is common to a plurality of steps;

generating, by the processor the holistic chart, wherein the holistic chart is for the particular product and has a time axis which is an axis corresponding to time, and a step axis which is an axis perpendicular to the time axis and corresponds to steps; and displaying, by the processor, a user interface including the holistic chart on a display, wherein the user interface changes a display mode of an individual cell in the holistic chart based on whether the retention increase rate corresponding to a time point and a step that corresponds to the individual cell is a negative value, zero, or a positive value, and a difference between the retention increase rate and the rate reference value.

* * * * *